United States Patent
Otomo et al.

(10) Patent No.: US 6,824,575 B1
(45) Date of Patent: Nov. 30, 2004

(54) INTEGRATED COAL GASIFICATION COMBINED CYCLE POWER GENERATOR

(75) Inventors: Fumio Otomo, Kanagawa-ken (JP); Yoshitake Fukuyama, Kanagawa-ken (JP); Tatsuro Uchida, Tokyo (JP); Masaharu Utsunomiya, Tokyo (JP); Hiromitsu Iijima, Kanagawa-ken (JP); Yoshihiro Aburatani, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/384,082

(22) Filed: Aug. 26, 1999

(30) Foreign Application Priority Data

Aug. 28, 1998 (JP) .......................................... P10-243274

(51) Int. Cl.[7] .............................. F02B 41/00; F02C 5/00; F02C 6/00; C01J 3/68
(52) U.S. Cl. ........................ 48/77; 48/197 R; 60/39.12; 60/39.181; 60/39.182; 60/39.34; 60/39.35
(58) Field of Search ................................. 48/77, 197 R; 60/39.03, 39.05, 39.12, 39.181, 39.182, 39.75, 39.34, 39.35

(56) References Cited

U.S. PATENT DOCUMENTS

| | | | | |
|---|---|---|---|---|
| 4,571,935 A | * | 2/1986 | Rice | 60/39.05 |
| 4,946,477 A | * | 8/1990 | Perka et al. | 48/197 R |
| 5,081,845 A | * | 1/1992 | Allam et al. | 62/646 |
| 5,160,096 A | * | 11/1992 | Perkins et al. | 60/39.05 |
| 5,327,718 A | * | 7/1994 | Iwata et al. | 60/39.03 |
| 5,345,756 A | * | 9/1994 | Jahnke et al. | 60/39.02 |

FOREIGN PATENT DOCUMENTS

| | | |
|---|---|---|
| JP | 7-305607 | 11/1995 |
| JP | 8-246813 | 9/1996 |

OTHER PUBLICATIONS

Todd, "Technology/Commerical Development Of Gas Turbines for IGCC Power Plants", pp. 331–340, (1995).

* cited by examiner

Primary Examiner—Alexa Doroshenk
(74) Attorney, Agent, or Firm—Foley & Lardner LLP

(57) ABSTRACT

Embodiments of the invention provide an IGCC which achieves improved plant thermal efficiency by using a cooling steam supply system that cools the high-temperature sections of the gas turbine 34. Embodiments of the invention further provide and IGCC in which the cooling steam recovery system recovers steam after cooling the gas-turbine high-temperature section and makes practical re-use of the energy and substances within the system. Therefore, embodiments of the invention can reduce or eliminate the degradation of certain equipment by cooling the high-temperature sections. Methods are provided for increasing the thermal efficiency o an IGCC.

2 Claims, 16 Drawing Sheets

US 6,824,575 B1

INTEGRATED COAL GASIFICATION COMBINED CYCLE POWER GENERATOR

FIELD OF THE INVENTION

The present invention relates to an Integrated Coal Gasification Combined Cycle Power Generator (hereinafter referred as IGCC.)

DESCRIPTION OF THE RELATED ART

Reducing the amount of the fossil fuel used and improving system heat efficiency is desired in the latest steam-generated power-generator systems.

Coal, the fossil fuel used for steam-generated power-generator systems, is available in abundant amounts compared to petroleum or natural gas. Consequently, coal is cheaper than petroleum or natural gas. However, although long-term, stable supply is possible, coal burning results in the discharge of environmental pollutants, such as $CO_2$ and $SO_x$. For the above-mentioned reason, use of petroleum or the comparatively clean fuel from natural gas occupies the mainstream.

However, the danger of excessive dependence on petroleum as a source of energy was pointed out by the petroleum crisis of the 1970s.

Moreover, the estimated depletion years of a petroleum and a natural gas, quoting from "Comprehensive Energy Statistics of the Energy Agency, 1991", will be just 50 years. Considering this fact, long-term stable price and supply of a clean fuel, such as these fuels, is becoming hard.

Consequently, the practical re-use of coal fuel gas to a thermoelectric power system is being recognized once again considering that the possible depletion years will be more than about 300 years based on the estimated amount of coal deposits.

The IGCC which uses a coal-gasification syngas fuel, reduces environmental pollution by generating less $CO_2$, $SO_x$, $NO_x$. Referring to FIG. 16, a conventional system of the IGCC is explained.

As shown in FIG. 16, the IGCC constitutes a coal-gasification system (1), a gas-turbine system (2), an exhaust heat recovery boiler (3), and a steam turbine system (4).

In addition, the exhaust heat recovery boiler can be substituted for a heat recovery steam generator.

The coal-gasification system 1 is provided with a coal supply portion 5, an oxygen system 6, and a coal-gasifier 7.

That is, a pulverized coal from the coal supply portion 5 and an oxygen gas from the oxygen system 6 are supplied to the coal gasifier 7, and a part of the pulverized coal is burned in the coal gasifier 7.

The remaining pulverized coal reacts according to the following formula, keeping the temperature above the melting point of coal ashes, in the range of about 1500 degrees C. to about 1800 degrees C.

A combustible coal gas which is composed of carbon monoxide (CO) as a major ingredient is refined as a result of this reaction.

$$CO_2+C=2CO.$$

The oxygen system 6 is provided with an air-compressor 9 driven by a motor 8.

That is, after the air-compressor 9 compresses an inhaled air, producing a high-pressure air, the air-compressor 9 separates the high-pressure air into an oxygen gas and a nitrogen gas.

After separation from the high-pressure air, the oxygen gas is supplied to a coal gasifier 7. The air-compressor 9 makes the oxygen gas so-called oxygen blown gas and combustible coal gas is refined in the coal gasifier as mentioned above. After separation, the nitrogen gas is supplied to the gas-turbine system 2.

Moreover, the coal-gasification system 1 is provided with a cooler 10 and a gas clean-up unit 11.

A combustible coal gas refined in the coal gasifier 7 is cooled to about 400 degrees C. in the cooler 10. Then, the combustible coal gas is supplied to the gas-turbine system 2 as the clean coal gasification syngas fuel, after the removal of impurities, such as sulfur and dust, by the gas clean-up unit 11.

In addition, the cooler 10 cools the combustible coal gas by using cooling water from the steam turbine system 4. Since the cooling water is recovered again in the steam turbine system 4, the effective practical use of heat can be attained.

The gas-turbine system 2 is provided an with air-compressor 12, a gas turbine combustor 13, a gas turbine 14 and an alternator 15.

The air-compressor 12 supplies high-pressure air to the gas turbine combustor 13 which is combined with nitrogen gas from the oxygen system 6 and clean coal-gasification gas from the gas cleanup unit 11.

While the gas turbine combustor 13 dilutes the coal gasification syngas fuel with the nitrogen gas, an expansion work is performed in the gas turbine 14 by using the combustible gas.

An alternator 15 is driven by the driving torque generated by the expansion work. Moreover, the combustible gas which completed the expansion work in the gas turbine 14 is supplied to the exhaust heat recovery boiler 3 as an exhaust gas.

The exhaust heat recovery boiler 3 include a heat exchanger (16), which constitutes a super heater, an evaporator and an economizer. Moreover, the exhaust heat recovery boiler 3 uses the exhaust gas supplied from the gas turbine 14 in the gas-turbine system 2 as a heat source. That is, in the exhaust heat recovery boiler 3, a condensate/feed-water supplied from the steam turbine system 4 performs heat exchange in the heat exchanger 16, as a result, steam generated in the heat exchanger 16 is supplied to the steam turbine system 4.

The steam turbine system 4 is provided with a steam turbine 17, an alternator 18, a condenser 19 and a feed-water pump 20. The turbine working steam is made from the steam generated in the exhaust heat recovery boiler 3 and the steam from the cooler 10 in the coal-gasification system 1. Further, the turbine working steam supplied to the steam turbine 17 drives the alternator 18 by the driving torque generated through performing expansion work.

After performing the expansion work, the turbine working steam (an exhaust gas) is condensed to be used as the condensate/feed-water in the condenser 19. A part of the condensate/feed-water is supplied to the cooler 10 through the feed-water pump 20, then, the remainder of the condensate/feed-water flows back to the exhaust heat recovery boiler 3.

Thus, the IGCC, consisting of the coal-gasification system 1, the gas-turbine system 2, the exhaust heat recovery boiler 3 and the steam turbine system 4, uses the clean and refined coal gasification syngas fuel from the coal gasification system 1 as the gas-turbine working gas. In so doing, the IGCC improves system thermal efficiency and produces low $No_x$ emissions by combining the "Brayton Cycle" of the gas-turbine system 2 and the "Rankine Cycle" of the steam turbine system 4.

Although the conventional IGCC shown in FIG. 16 uses the coal gasification syngas fuel, a clean fuel, and produces an $NO_x$ concentration within regulatory limits, there are some problems.

One of the problems is related to the improvement in the system thermal efficiency.

In the IGCC, if the gas turbine 14 has a gas-turbine working gas temperature of 1300 degree-C. class, the system thermal efficiency is increased by more than 40%, according to "Outline of New Energy Conversion Technologies: The Heat Transfer Society of Japan, 1996".

Elevating the system thermal efficiency by more than 40% is dependent on a cooling technology applied to a high-temperature section of the gas-turbine combustor 13 and a high-temperature section of the gas-turbine 14, such as a liner of the combustor, a gas-turbine nozzle blade, gas-turbine rotor blade and a gas turbine rotor.

As is generally known, in this kind of a system, the higher a gas-turbine working gas temperature rises, the more the system thermal efficiency improves.

However, a super alloys applied to a high-temperature section of the gas-turbine system has as a characteristic an allowable temperature of at most 900 degree C. For this reason, to keep the strength of the high-temperature section within the allowable temperature on the condition that the gas-turbine working gas temperature is made to be high temperature, the gas-turbine nozzle blade and the gas-turbine rotor blade should be cooled as described below.

For example, a part of a high-pressure air generated in the air compressor 12 in the gas-turbine system 2 is extracted, and the gas-turbine nozzle blade and the gas-turbine rotor blade are cooled by applying the extracted high-pressure air to a forced convection cooling method, a film cooling method and a impingement cooling method.

However, cooling the high-temperature section of the gas-turbine system 2 by combining the above-mentioned methods is already coming to the limit of system thermal efficiency. That is, as the gas-turbine working gas approaches the allowable temperature limit, the amount of the high-pressure air used to cool the high-temperature section of the gas-turbine system 2 must increase in accordance with raising the inlet firing temperature of the gas turbine.

However, this increase of the high-pressure cooling air supplied to the high-temperature section of the gas-turbine is not contributed to the expansion work of the gas turbine 14. Therefore, the system thermal efficiency drops (deteriorates).

Moreover, although the coal gasification syngas fuel refined in the coal-gasification system 1 is a clean source of energy, it does contain some impurities, such as dust.

Further, even if a suitable combination among the forced convection cooling method, the film cooling method and the impingement cooling method, was available, a cooling performance as predicted by calculations could not be obtained because the impurities adhere to the gas-turbine nozzle blade and the gas-turbine rotor blade.

Because of the above-mentioned problems associated with cooling technology that supplies high-pressure air to the high-temperature section of the gas-turbine, a new alternative cooling technology to replace the high-pressure air is needed to improve the system thermal efficiency.

SUMMARY OF THE INVENTION

It is an object of this disclosure to provide embodiments of the inventions described herein which overcome one or more of the disadvantages of the related art described above.

In accordance with the foregoing objects an embodiment of the invention provides an integrated coal gasification combined cycle power generator which comprises a coal gasification system in which a combustible gas is produced from coal. The combustible gas produced in the coal gasification system is supplied to a gas turbine system. A gas turbine in the gas turbine system performs expansion work using the combustible gas and supplied the exhaust gas generated therefrom to a heat recovery system. The heat recovery system uses the exhaust gas supplied from the gas turbine as a heat source and supplies the steam generated in the heat exchange to a steam turbine system. The steam turbine system performs expansion work on the steam generated in the heat recovery system. The steam turbine system comprises a condenser used to condense steam from the steam turbine to water. The condensed water is supplied to a heat exchanger in the coal gasification system where it is heated to steam. The steam is then supplied to at least one section of the gas turbine system which is at a temperature higher than the temperature of the steam for the purpose of cooling that section. A higher-temperature steam is recovered from the high-temperature section of the gas turbine system and may be supplied to the heat recovery system or to the steam turbine.

Another embodiment of the invention provides an integrated coal gasification combined cycle power generator similar to that described above. In this embodiment, however, the steam from the coal gasification system is then supplied to a driving turbine which is adapted to power an air compressor.

Yet another embodiment of the invention provides an integrated coal gasification combined cycle power generator in which the heat recovery system performs heat exchange using the exhaust gas supplied from the gas turbine as a heat source and water to cool the exhaust gas. The steam generated therefrom is supplied to at least one section of the gas turbine system which is at a higher temperature than the steam. A higher-temperature steam is recovered from the high-temperature section of the gas turbine system and may be supplied to a coal gasifier in the coal gasification system.

A further embodiment provides an integrated coal gasification combined cycle power generator where nitrogen gas generated in the coal gasification system is supplied to at least one high-temperature section of the gas turbine system, producing a higher-temperature nitrogen gas. The higher-temperature nitrogen gas is recovered and supplied to a gas turbine combustor in the gas turbine system.

Also provided are methods of improving the system thermal efficiency of IGCC, such methods comprising use of the IGCC system described herein.

BRIEF DESCRIPTION OF THE DRAWINGS

A more complete appreciation of the embodiments of the inventions disclosed herein and advantages thereof will be readily obtained by reference to the following detailed description when considered in connection with the accompanying drawings.

DETAILED DESCRIPTION OF THE DISCLOSED EMBODIMENTS

Embodiments of the invention provide an IGCC which achieves improved thermal efficiency and practical re-use of energy and substances within the system. Embodiments thus provide heat exchange in the coal gasification system of the IGCC to produce steam that then is used in a variety of ways to improve the efficiency of the IGCC.

For example, the steam can be used to cool section of the gas turbine system which are at a higher temperature than the steam. Such portions are hereinafter referred to as high-temperature sections. In such cases, a higher temperature steam can be recovered from the high temperature section and used elsewhere in the IGCC, for example, in the steam turbine system, the heat recovery system or in a system that supplies coal to the coal gasification system.

Alternatively, or in addition, the steam can be used to drive a turbine, for example, a driving turbine that can generate energy for other uses.

Alternatively, or in addition, the steam can be provided to the heat recovery system where it can be used to cool higher temperature exhaust gases.

The skilled artisan will appreciate that many modifications can be made to IGCC's employing the above-described embodiments. As but a few examples show, such modifications could include (1) the use of air for cooling a high temperature section, in addition to the steam, (2) the use of detectors to monitor the calorific value of the combustible gas and control the flow rate of the gas or other systems within the IGCC, (3) the use of multiple heat exchangers with the heat recovery system, and (4) the use of nitrogen gas within the IGCC to cool a high temperature section. Many other modifications are contemplated, some which are shown in the embodiments in the figures.

Figure 1:
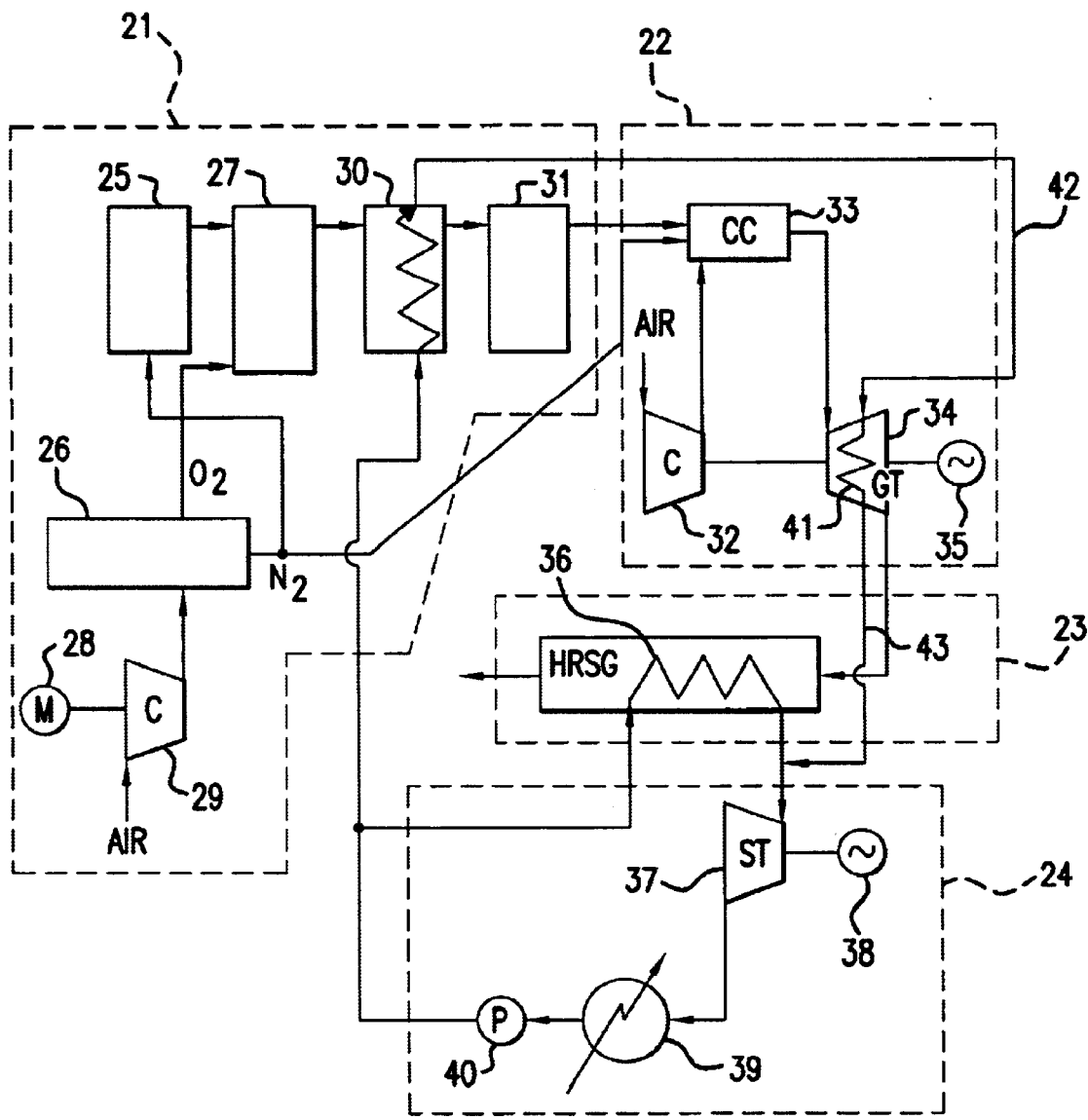
FIG. 1 is a system diagram schematically showing an integrated coal gasification combined cycle power generator according to a first embodiment of this invention.

Referring now to the drawings, FIG. 1 provides a system diagram schematically showing an integrated coal gasification combined cycle power generator according to a first embodiment of this invention.

The IGCC concerning this embodiment is constituted from a coal-gasification system 21, a gas-turbine system 22, an exhaust heat recovery boiler 23 and a steam turbine system 24.

In addition, although a heat recovery steam generator can be substituted for the exhaust heat recovery boiler 23, the following embodiments adopt the exhaust heat recovery boiler as heat recovery means.

The coal-gasification system 21 combines a coal supply portion 25, an oxygen system 26 and a coal gasifier 27. That is, in the coal-gasification system 21, a pulverized coal from the coal supply portion 25 and an oxygen gas from the oxygen system 26 are supplied to the coal gasifier 27.

A part of the pulverized coal is burned in the coal gasifier 27.

The remaining pulverized coal reacts according to the following formula, keeping the temperature above the melting point of coal ashes, in the range of about 1500 degrees C. to about 1800 degrees C.

A combustible coal gas which is composed of carbon monoxide (CO) as a major ingredient is refined as a result of this reaction.

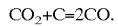
$$CO_2+C=2CO.$$

The oxygen system 26 is provided with an air-compressor 29 driven by a motor 28. That is, the air-compressor 29 compresses a suction air, producing a high-pressure air, the high-pressure air is separated into an oxygen gas and a nitrogen gas. After separation, the oxygen gas is supplied to the coal gasifier 27.

While the oxygen system 26 makes the oxygen gas into a so-called oxygen blown gas and refines the combustible coal gas mentioned above, the nitrogen gas is supplied, after separation, to the gas turbine system 22 and the coal supplying portion 25. In the coal supplying equipment 25, a pulverized coal is conveyed to the coal gasifier 27 by using the nitrogen gas.

Moreover, the coal-gasification system 21 is provided with a cooler 30 and a gas clean-up unit 31.

After the combustible coal gas refined in the coal gasifier 27 is cooled to about 400 degrees C. in the cooler 30 and after the impurities of the combustible gas are recovered in the gas cleanup unit 31, the combustible coal gas is supplied to the gas turbine system 22 as a clean coal gasification syngas fuel.

In the present embodiment, the gas-turbine system 22 is provided with an air-compressor 32, a gas turbine combustor 33, a gas turbine 34 and an alternator 35. That is, the air-compressor 32 compresses a suction air and makes a high-pressure air.

The high-pressure air is supplied to the gas turbine combustor 33, with the coal gasification syngas fuel from the gas clean-up unit 31 in the coal-gasification system 21 and the nitrogen gas from the oxygen system 26.

The gas turbine combustor 33 dilutes the coal gasification syngas fuel by adding the nitrogen gas and generating a low concentration combustible gas of $No_x$.

Expansion work is performed by burning the combustible gas in the gas turbine 34.

After driving an alternator 35 with the driving torque generated by the expansion work, the combustible gas which completed the expansion work is supplied to the exhaust heat recovery boiler 23.

The exhaust heat recovery boiler 23 consists of a heat exchanger 36, such as a super heater, an evaporator and an economizer. That is, in the exhaust heat recovery boiler 23, the exhaust gas supplied from the gas turbine 34 in the gas-turbine system 22 is treated as a heat source. In the exhaust heat recovery boiler a condensate/feed-water supplied from the steam turbine system 24 performs heat exchange in the heat exchanger 36. As a result, steam is generated.

The steam obtained by the heat exchange is supplied to the steam turbine system 24.

The steam turbine system 24 consists of a steam turbine 37, a generator 38, a condenser 39 and a feed-water pump 40. That is, the steam from the exhaust heat recovery boiler 23 become turbine working steam, and is supplied to the steam turbine 37.

Expansion work is performed in the steam turbine system 24.

After driving the alternator 38 using the driving torque generated at the expansion work, the turbine working steam (turbine exhaust gas) which completed the expansion work is condensed and become the condensate/feed-water.

Furthermore, the condensate/feed-water flow back to the exhaust heat recovery boiler 23 through a feed-water pump 40. Part of the condensate/feed-water is supplied to the cooler 30 to cool the coal combustible gas.

Moreover, the IGCC has a cooling steam supply system 42 and a cooling steam recovery system 43.

The cooling steam supply system 42 has an outlet on the cooler 30 in the coal gasification system 1 and is connected to the gas-turbine high-temperature sections of the gas turbine 41, such as the gas-turbine nozzle blade, the gas-turbine rotor blade and the gas-turbine rotor.

The cooling steam recovery system 43 connects to the outlet side of the gas-turbine high-temperature section 41 and is connected to an inlet side of the steam turbine 37 in the steam turbine system 24.

That is, the high-temperature coal gasification syngas fuel from the coal gasifier 27 performs heat exchange in the cooler 30 with the condensate/feed-water.

Afterwards, the steam generated through the heat exchange is supplied to the gas-turbine high-temperature section 41 of the gas turbine 34 as a cooling steam.

After that, the cooling steam is recovered by the steam turbine 37.

As mentioned above, this embodiment has the cooling steam supply system 42 connecting the cooler (30) to the gas-turbine high-temperature section 41 of the gas turbine 34 and the cooling steam recovery system 43 recovering the cooling steam after it cools the gas-turbine high-temperature section 41 to the steam turbine 37.

Therefore, this embodiment provides certain effects as described below.

First, it assists in the maintenance of the high-temperature sections of the gas turbine (41) by cooling parts such as the gas turbine nozzle blade, the gas turbine rotor blade and the gas turbine rotor. Thus, this embodiment can reduce the need for incidental equipment.

Second, an effective practical use of heat can be attained by supplying the cooling steam to the steam turbine 37.

Accordingly, this embodiment offers the potential for reduced power expense for a pulverized coal feeder.

Therefore, according to this embodiment, since effective practical use of heat energy is attained through the effective cooling of the gas-turbine high-temperature section 41, the system thermal efficiency can be improved with the high-temperature of the gas turbine working gas.

In addition, the steam from the cooler 30 can be supplied to a high-temperature section of the gas turbine combustor 33 for cooling, instead of or in addition to being supplied to the gas turbine 34.

Further, the steam from the cooler 30 can be supplied to the high temperature section of both the gas turbine combustor 33 and the gas turbine 34.

Further, it is possible for the steam, after cooling the high-temperature section, to be recovered in the coal gasifier 27 as the gasification substance instead of the oxygen gas. This embodiment would reduce the thermal energy required to refine the coal gasification syngas fuel and, as a result, would improve plant thermal efficiency.

Figure 2:
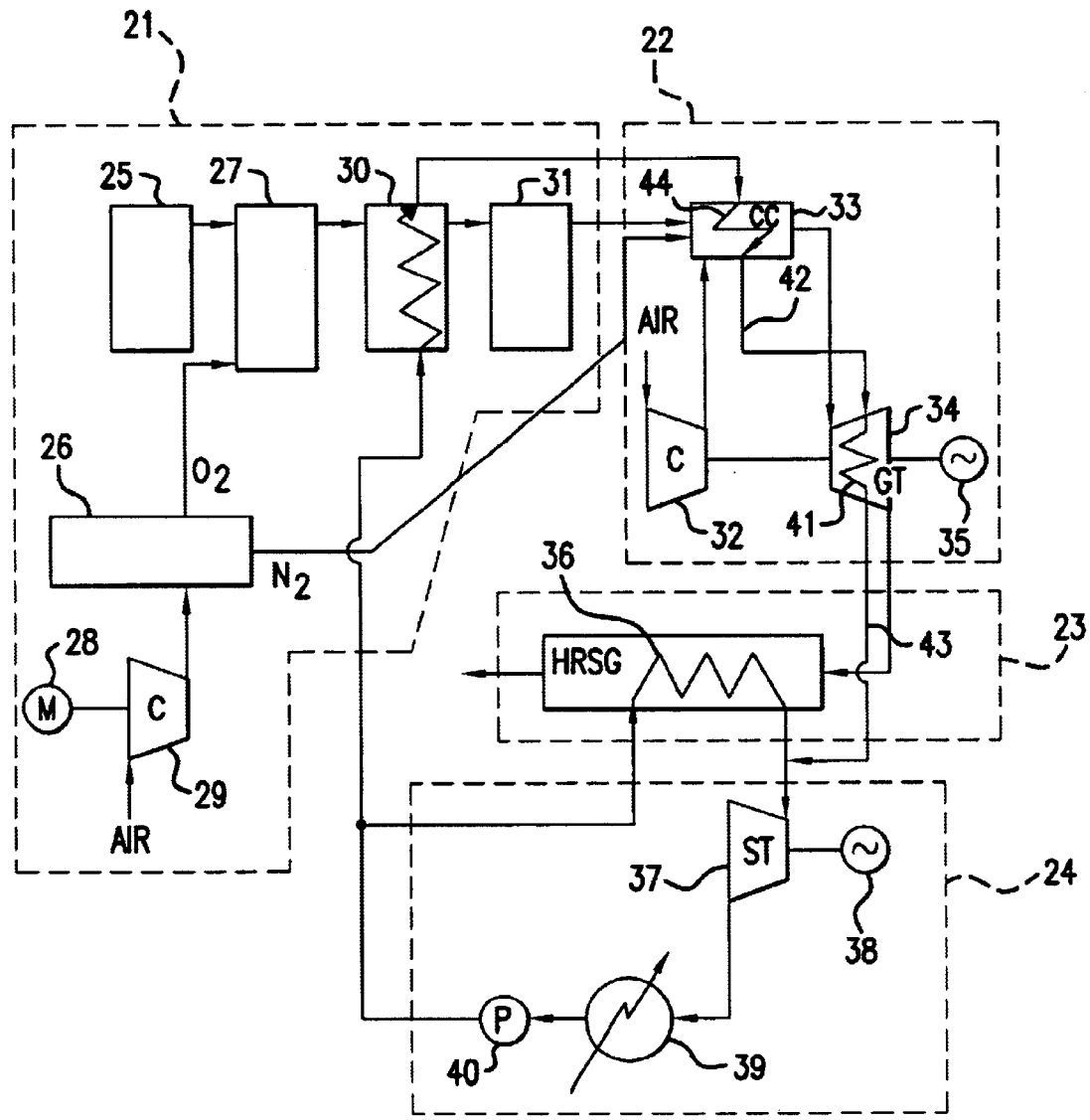
FIG. 2 is a system diagram schematically showing an integrated coal gasification combined cycle power generator according to a second embodiment of this invention.

FIG. 2 is a system diagram schematically showing an integrated coal gasification combined cycle power generator according to a second embodiment of this invention.

Those elements of FIG. 2 which are the same as in FIG. 1 have been given the same number as in FIG. 1. A discussion of those elements is not repeated. A similar protocol will be followed when discussing the other figures below.

The IGCC of the second embodiment, provides a cooling steam supply system 42 and a cooling steam recovery system 43. In this embodiment, the nitrogen gas is not supplied to the coal supplying equipment 25 because the coal supply portion 25 delivers a coal slurry. Coal slury is conveyed to the coal gasifier 27 by a conveying equipment such as a pump (not shown).

The cooling steam supply system 42 is connected to the outlet side of a cooler 30 in a coal gasification system 20. It is also connected to the gas-turbine high-temperature section 41 in the gas turbine 34 through the combustor high-temperature section 44, such as a liner of the combustor and a transition piece, in the gas turbine combustor 33.

The cooling steam recovery system 43 is connected to an outlet side of the gas-turbine high-temperature section 41 an is connected to an inlet side of the steam turbine 37 in the steam turbine system 24.

The high-temperature coal gasification syngas fuel from the coal gasifier 27 and a condensate and a feed-water from the steam turbine system 24 perform heat exchange in the cooler 30.

Steam generated through the heat exchange is supplied to the combustor high-temperature section 44 and the gas-turbine high-temperature section 41.

After a cooling steam cools the combustor high-temperature section 44 and the gas-turbine high-temperature section 41, the cooling steam is recovered by the steam turbine 37.

The advantages of an embodiment having the cooling steam supply system 42 and the cooling steam recovery system 43 are described below.

First, the strength of composition parts of the gas-turbine high-temperature section 41 and the combustor high-temperature section 44 can be maintained by cooling them.

Second, the effective practical use of the heat can be attained by recovering the cooling steam to the steam turbine 37.

Therefore, according to this embodiment, a high-temperature gas turbine working gas and improved plant thermal efficiency can be accomplished by the effective practical use of heat based on the effective cooling of the gas-turbine high-temperature section 41 and the combustor high-temperature section 44.

Although the steam from the cooler 30 is supplied to the high-temperature section of both the gas turbine combustor 33 and the gas turbine 34, in this embodiment, it would be possible to supply the steam to at least one of the high-temperature sections of both the gas turbine combustor 33 and the gas turbine 34 for cooling.

In addition, it is possible for the steam, after cooling the high-temperature section, to be recovered in the coal gasifier 27 as the gasification substance instead of the oxygen gas. This embodiment allows a reduction in the thermal energy required to refine the coal gasification syngas fuel, thereby improving plant thermal efficiency.

Figure 3:
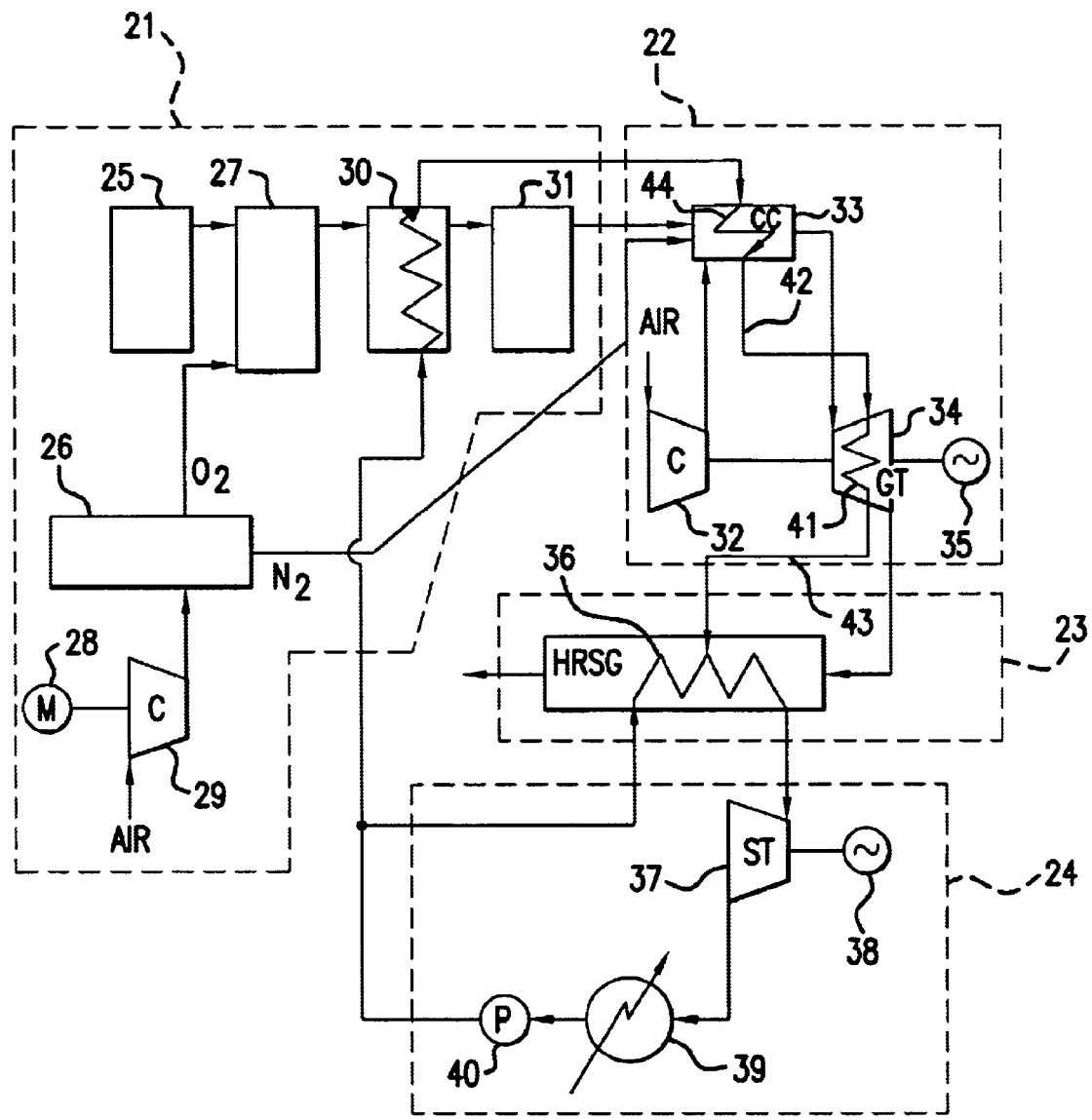
FIG. 3 is a system diagram schematically showing an integrated coal gasification combined cycle power generator according to a third embodiment of this invention.

FIG. 3 is a system diagram schematically showing an integrated coal gasification combined cycle power generator according to a third embodiment of this invention.

The embodiment depicted in FIG. 3 provides a cooling steam supply system 42 and a cooling steam recovery system 43. As this embodiment also utilizes a coal slurry as fuel, the nitrogen gas is not supplied to the coal supply portion 25. That is, the coal slurry is supplied by a conveying equipment such as a pump (not shown).

The steam supply system 42 connects to the outlet side of a cooler 30 in a coal-gasification system 21 and connects to a gas-turbine high-temperature section 41 of a gas turbine 34 through a combustor high-temperature section 44. The high-temperature section of the gas turbine combustor (33) may include the liner of a combustor the and transition piece.

The cooling steam recovery system 43 is connected to the outlet side of a gas-turbine high-temperature section 41 and is connected to a first heat exchanger 36, such as a medium-pressure economizer, of an exhaust heat recovery boiler 23.

According to the above conditions, the high-temperature coal gasification syngas fuel from the coal gasifier 27 and a condensate/feed-water from the steam turbine system 24 perform heat exchange in the cooler 30.

The steam generated through the heat exchange is supplied to the combustor high-temperature section 44 and the gas-turbine high-temperature section 41 in series. The cooling steam is then recovered by the intermediate heat exchanger in the first heat exchanger 36.

As mentioned above, this embodiment has a cooling steam supply system 42 supplying cooling steam from the cooler 30 to the gas-turbine high-temperature section 41 through the combustor high-temperature section 44. This embodiment also provides a cooling steam recovery system 43 such that after cooling the gas-turbine high-temperature section 41 and the combustor high-temperature section 44 the cooling steam is recovered by the intermediate heat exchanger of the first heat exchanger 36.

Some effects of this embodiment are described below.

First, the strength of the high-temperature sections of the gas-turbine 41 and the combustor 44 can be maintained by cooling.

Second, effective practical use of heat can be attained by supplying the cooling steam to the intermediate heat exchanger of the first heat exchanger 36. In particular, if the intermediate heat exchanger in the first heat exchanger 36 in the exhaust heat recovery boiler 23 recovers the cooling steam after cooling the gas-turbine high-temperature section 41, then the cooling steam can be heated to obtain an appropriate temperature and pressure and can then be supplied to the steam turbine 37 again.

Moreover, the system thermal efficiency improves due to the increased output of the steam turbine 37.

Further, it is possible for the steam, after cooling the high-temperature section, to be recovered in the coal gasifier 27 as the gasification substance instead of the oxygen gas. Thus, the thermal energy required to refine the coal gasification syngas fuel is cut down, and as a result, plant thermal efficiency can be improved.

Figure 4:
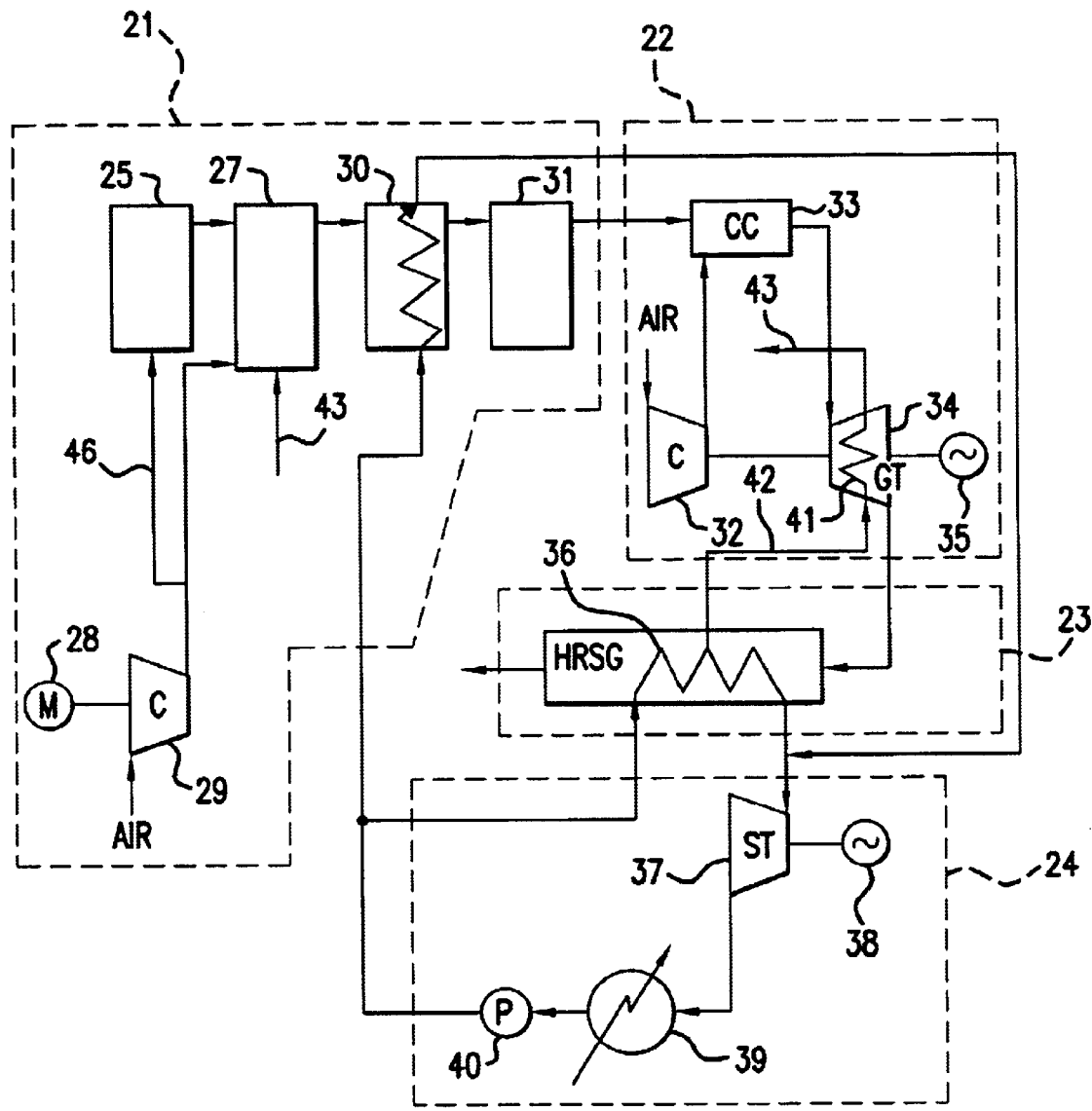
FIG. 4 is a system diagram schematically showing an integrated coal gasification combined cycle power generator according to a fourth embodiment of this invention.

FIG. 4 is a system diagram schematically showing an integrated coal gasification combined cycle power generator according to a fourth embodiment of this invention.

The IGCC of this embodiment includes a cooling steam supply system 42, a cooling steam recovery system 43 and a pulverized coal feed system 46.

The cooling steam supply system 42 connects the intermediate heat exchanger on the outlet side of the high-pressure economizer of the first heat exchanger 36 in the exhaust heat recovery boiler 23 to the gas-turbine high-temperature section 41 of the gas turbine 34.

The cooling steam recovery system 43 delivers cooling steam from the outlet side of the gas-turbine high-temperature section 41 to the coal gasifier 27 of the coal gasification system 21.

The pulverized coal feed system 46 supplies high-pressure air from an air compressor 29 to a coal supply portion 25 as an oxidant.

In this embodiment, since the coal gasification syngas fuel refined from the coal gasifier 27 has a low calorific value, a pure oxygen gas need not be supplied to the coal gasifier 27.

As mentioned above, this embodiment provides the cooling steam supply line 42, coming off of the heat exchanger 36 in the exhaust heat recovery boiler 23. The cooling steam recovery line 43, which comes off of the gas-turbine high-temperature section 41, is recovered as a gasification substance by the coal gasifier 27.

Therefore, this embodiment has the effects described below.

That is, first, it can be made to maintain the strength of composition parts by cooling the gas-turbine high-temperature section 41 and thus, a high-temperature of the gas turbine working gas can be obtained.

Second, as the cooling steam is recovered in the coal gasifier 27 as the gasification substance, a thermal energy required to refine the coal gasification syngas fuel is cut down, as a result, a system thermal efficiency can be improved.

Alternatively, this embodiment can reduce the number of incidental equipment and minimize power expense required for a pulverized coal feeder.

Figure 5:
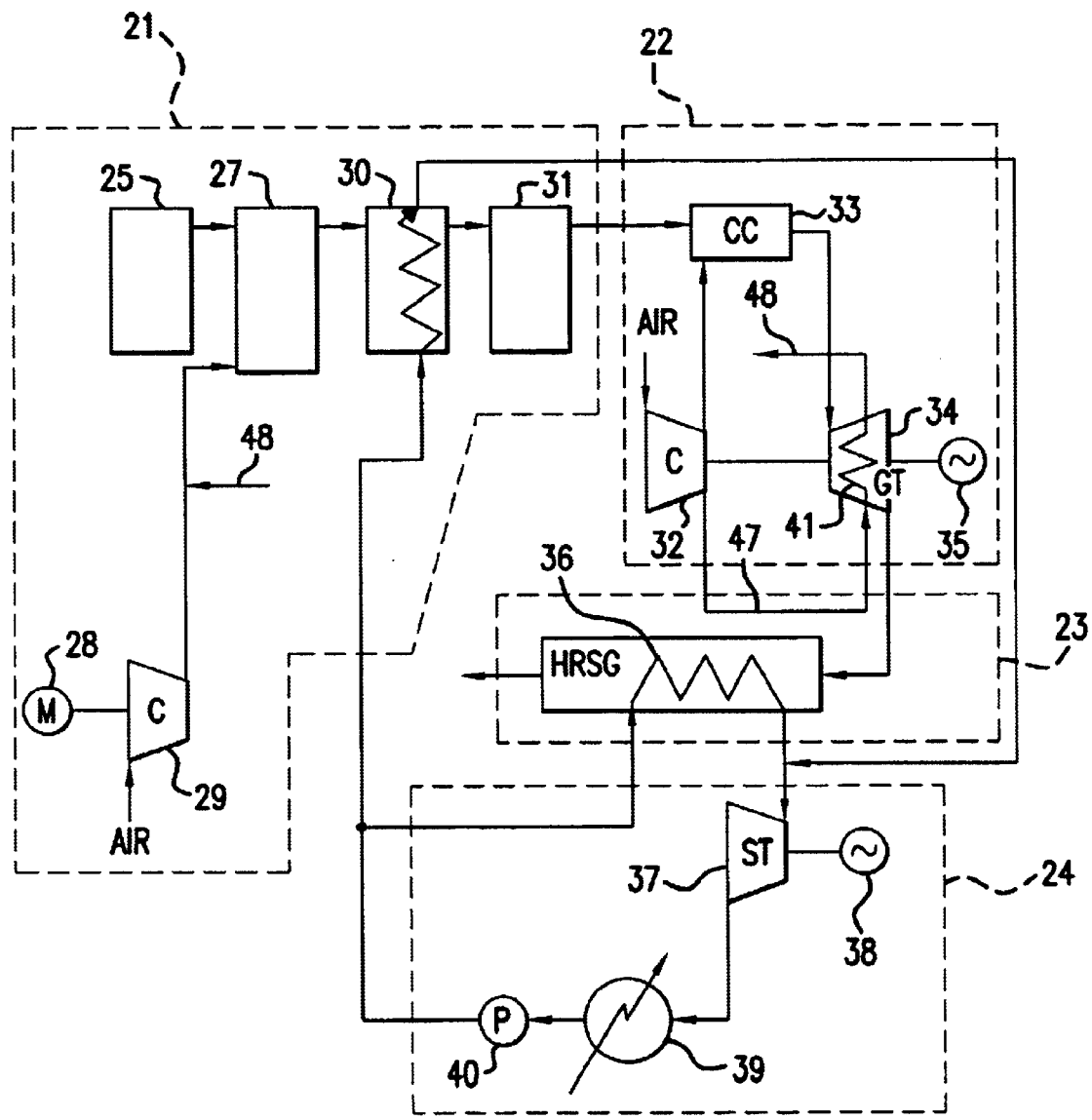
FIG. 5 is a system diagram schematically showing an integrated coal gasification combined cycle power generator according to a fifth embodiment of this invention.

FIG. 5 is a system diagram schematically showing an integrated coal gasification combined cycle power generator according to a 5th embodiment of this invention.

The IGCC of this embodiment includes a cooling air supply system 47 and a cooling air recovery system 48.

In the cooling air supply system 47, a high-pressure air, which is extracted from an air compressor 32 in a gas turbine system 22, is supplied to a gas-turbine high-temperature section 41 of a gas turbine 34.

In the cooling air recovery system 48, a cooling air recovered after cooling combustor high-temperature section 41 is supplied to the coal gasifier 27.

In this embodiment the cooling air supply system 47 uses high-pressure air as the cooling air, which is supplied by the air compressor 32 to the gas-turbine high-temperature section 41. The cooling air recovery system 48 recovers the cooling air after it cools the gas-turbine high-temperature section 41 and supplies it to the coal gasifier 27 as the oxidizer. Therefore, this embodiment have some effects described below.

That is, first, it can be made to maintain an intensity of composition parts highly by cooling of the gas-turbine high-temperature section 41 and the high-temperature of the gas turbine working gas can be obtained.

Second, as the cooling steam is recovered in the coal gasifier 27 as the oxidizer, the coal gasifier 27 can be operated independently even if there is some accident in the air compressor 29. As a result, a system thermal efficiency can be improved.

Figure 6:
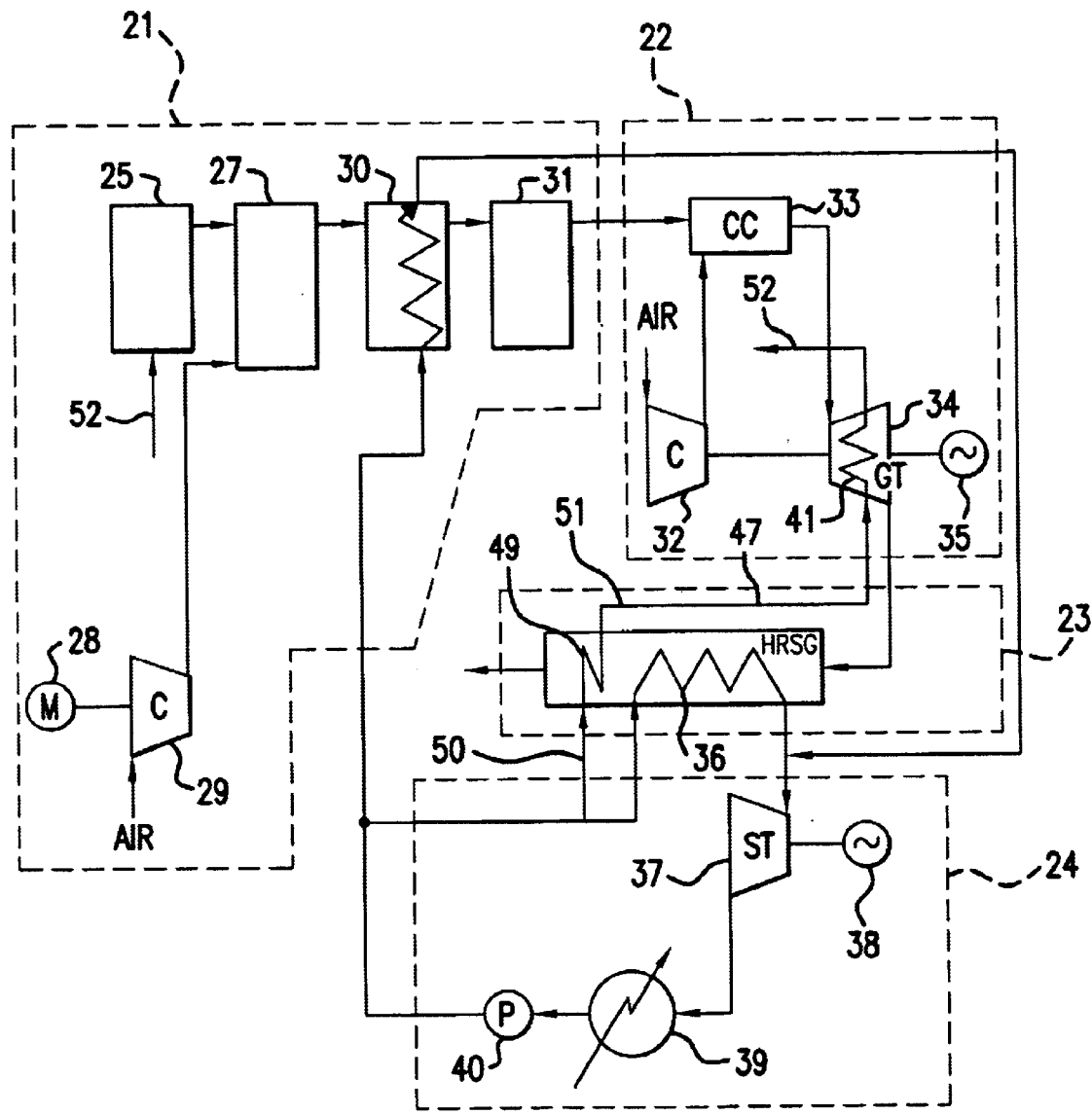
FIG. 6 is a system diagram schematically showing an integrated coal gasification combined cycle power generator according to a sixth embodiment of this invention.

FIG. 6 is a system diagram schematically showing an integrated coal gasification combined cycle power generator according to a 6th embodiment of this invention.

The IGCC of this embodiment includes a condensate/feed-water system 50, a hot-water supply system 51 and the hot-water recovery system 52.

The condensate/feed-water line 50 supplies feed water to a second heat exchanger (49), such as a low pressure economizer, which is provided in a downstream side of an exhaust heat recovery boiler 23, and is connected to an outlet side of a feed-water pump (40) in a steam turbine system 24.

The hot water supply line (51) receives a condensate/feed-water heated by the second heat exchanger (49), and supplies to heated water to the gas-turbine high-temperature section 41 of the gas turbine 34.

The hot water recovery line (52) receives a hot water condensate/feed-water used for cooling the gas-turbine high-temperature section (41). The hot water is used to prepare a coal water slurry or a coal water mixture for the coal supply portion (25) of the coal-gasification system (21).

As mentioned above, since this embodiment has the condensate/feed-water line (50), the hot water supply line (51) and the hot-water recovery line (52), this embodiment has some of the effects described below.

That is, it can help to maintain the high-temperature sections of the gas-turbine by cooling those sections. In addition, the high-temperature of the gas turbine working gas can be obtained, thereby improving plant thermal efficiency.

Second, as the hot water condensate/feed-water for cooling as the coal water slurry or the coal water mixture is recovered by the coal supply portion 25, this embodiment can minimize incidental equipment and power expense required for the coal water slurry or the coal water mixture.

In addition, the steam from the second heat exchanger 49 can be supplied to the gas-turbine combustor 33, and the steam after cooling the high-temperature section of the gas-turbine combustor 33 can be supplied to the coal supplying portion 25.

Figure 7:
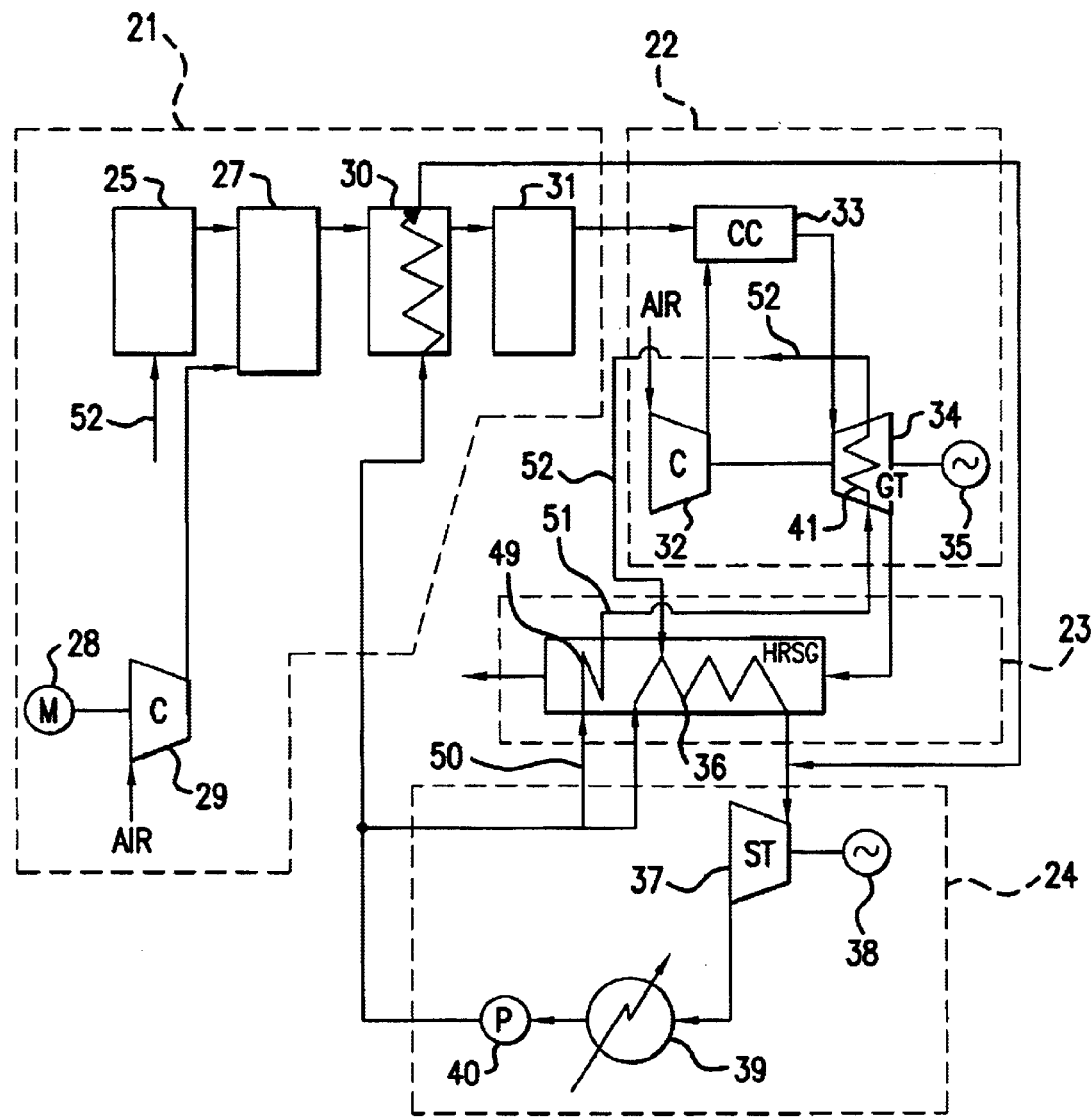
FIG. 7 is a system diagram schematically showing an integrated coal gasification combined cycle power generator according to a seventh embodiment of this invention.

FIG. 7 is a system diagram schematically showing an integrated coal gasification combined cycle power generator according to a 7th embodiment of this invention.

The IGCC of this embodiment includes a condensate/feed-water line 50, a hot-water supply line 51 and a hot-water recovery line 52.

The condensate/feed-water line 50 is fed to a second heat exchanger 49 such as a low pressure economizer, which is provide in a downstream side of an exhaust heat recovery boiler 23. Line 50 is connected to an outlet side of a feed-water pump 40 in a steam turbine system 24.

The hot-water supply system 51 takes condensate/feed-water heated in the second heat exchanger 49 and supplies it to a gas-turbine high-temperature section 41 of a gas turbine 34.

The hot-water recovery system 52 takes hot condensate/feed-water used for cooling the gas-turbine high-temperature section 41, and supplies that water to the first heat exchanger 36.

As mentioned above, this embodiments have the condensate/feed-water system 50, the hot-water supply system 51 and the hot-water recovery system 52. Therefore, this embodiment have some effects described below.

First, it maintains a high integrity of the composition of the parts by cooling the gas-turbine high-temperature section 41. In addition, the high-temperature of the gas turbine working gas can be obtained, thereby improving plant thermal efficiency.

Second, as the hot-condensate/feed-water for cooling is recovered in the first heat exchanger 36, the recovery of the thermal energy with the circulation of the hot-condensate/feed-water for cooling, and the improvement of the system thermal efficiency can be effected.

Third, as the hot water condensate/feed-water for cooling as the coal water slurry or the coal water mixture is recovered by the coal supply portion 25, this embodiment can minimize incidental equipment and power expense required for the coal water slurry or the coal water mixture.

Figure 8:
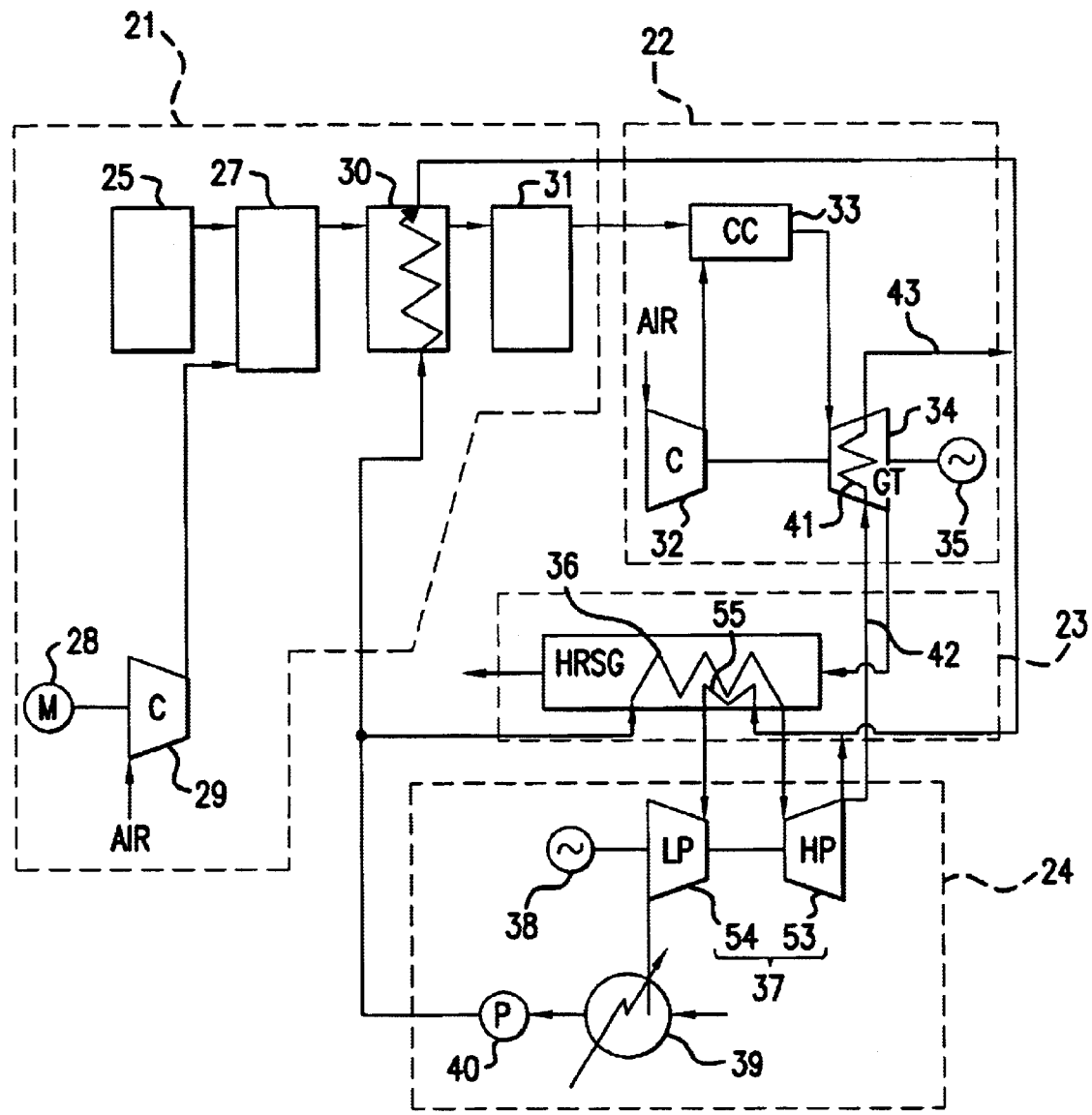
FIG. 8 is a system diagram schematically showing an integrated coal gasification combined cycle power generator according to an eighth embodiment of this invention

FIG. 8 is a system diagram schematically showing an integrated coal gasification combined cycle power generator according to an eighth embodiment of this invention.

The IGCC of this embodiment includes a cooling steam supply system 42 and a cooling steam recovery system 43. A steam turbine 37 of a steam turbine system 24 is divided into a high-pressure turbine 53 and a low-pressure turbine 54, and part of an exhaust gas of the high-pressure turbine 53 is supplied to a gas-turbine high-temperature section 41 of a gas turbine.

The cooling steam recovery line 43 takes steam that has cooled the gas-turbine high-temperature section 41, and supplies it to the low-pressure turbine 54 through an auxiliary heat exchanger in the exhaust heat recovery boiler 23.

In addition, steam generated in the cooler 30 of the coal-gasification system 21 and the steam for cooling after cooling the gas-turbine high-temperature section 41 are mixed with the remainder of the exhaust gas (equal to the steam for cooling) of the high-pressure turbine 53.

As mentioned above, this embodiment has the cooling steam supply system 42 and the cooling steam recovery system 43. Therefore, this embodiment has some effects described below. First, it maintains a high integrity of the composition of the parts by cooling the gas-turbine high-temperature section 41. In addition, the high-temperature of the gas turbine working gas can be obtained, thereby improving plant thermal efficiency.

Second, the exhaust gas can be recovered and, as a result, improvement of the system thermal efficiency is obtained.

Figure 9:
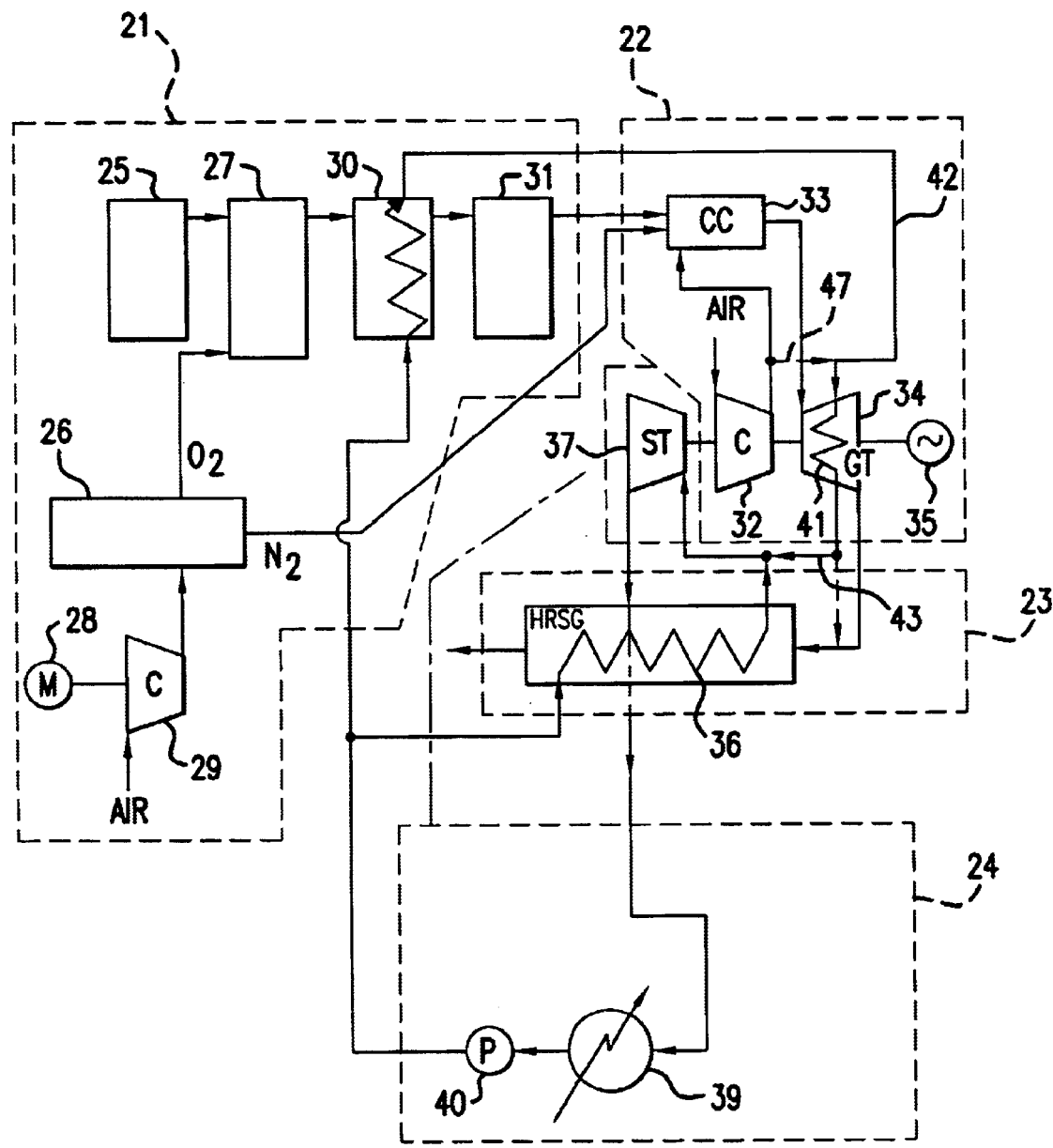
FIG. 9 is a system diagram schematically showing an integrated coal gasification combined cycle power generator according to a ninth embodiment of this invention.

FIG. 9 is a system diagram schematically showing an integrated coal gasification combined cycle power generator according to a ninth embodiment of this invention.

The IGCC of this embodiment comprises a cooling steam supply system 42, a cooling steam recovery system 43 and a cooling air recovery system 48.

The cooling steam supply line 42 takes steam generated in cooler 30 of the coal-gasification system 21 and supplies it to a gas-turbine high-temperature section 41 of a gas turbine 34 as a steam for cooling.

The cooling steam recovery system 43 takes steam used for cooling the gas-turbine high-temperature section 41 and mixes it with steam from a first heat exchanger 36, such as a super-heater, in the exhaust heat recovery boiler 23. The mixed steam is supplied to the steam turbine 37. During at a start-up operation, if a steam is not yet generated in the cooler 30, part of a high-pressure from an air-compressor 32 is supplied to the gas-turbine high-temperature section 41 as a air for cooling.

The cooling air recovery system 48 receives air that has been used for cooling the gas-turbine high-temperature section 41, and then supplies it to an exhaust heat recovery boiler 23.

As mentioned above, this embodiment has the cooling steam supply system 42, the cooling steam recovery system 43, the cooling air supply system 47 and the cooling air recovery system 48. Therefore, this embodiment has some effects described below. That is, a stable operation of the gas turbine 34 can be performed by cooling the gas-turbine high temperature section 41 during operation. In addition, the cooling air supply system 47 can be supplied to other embodiments.

Figure 10:
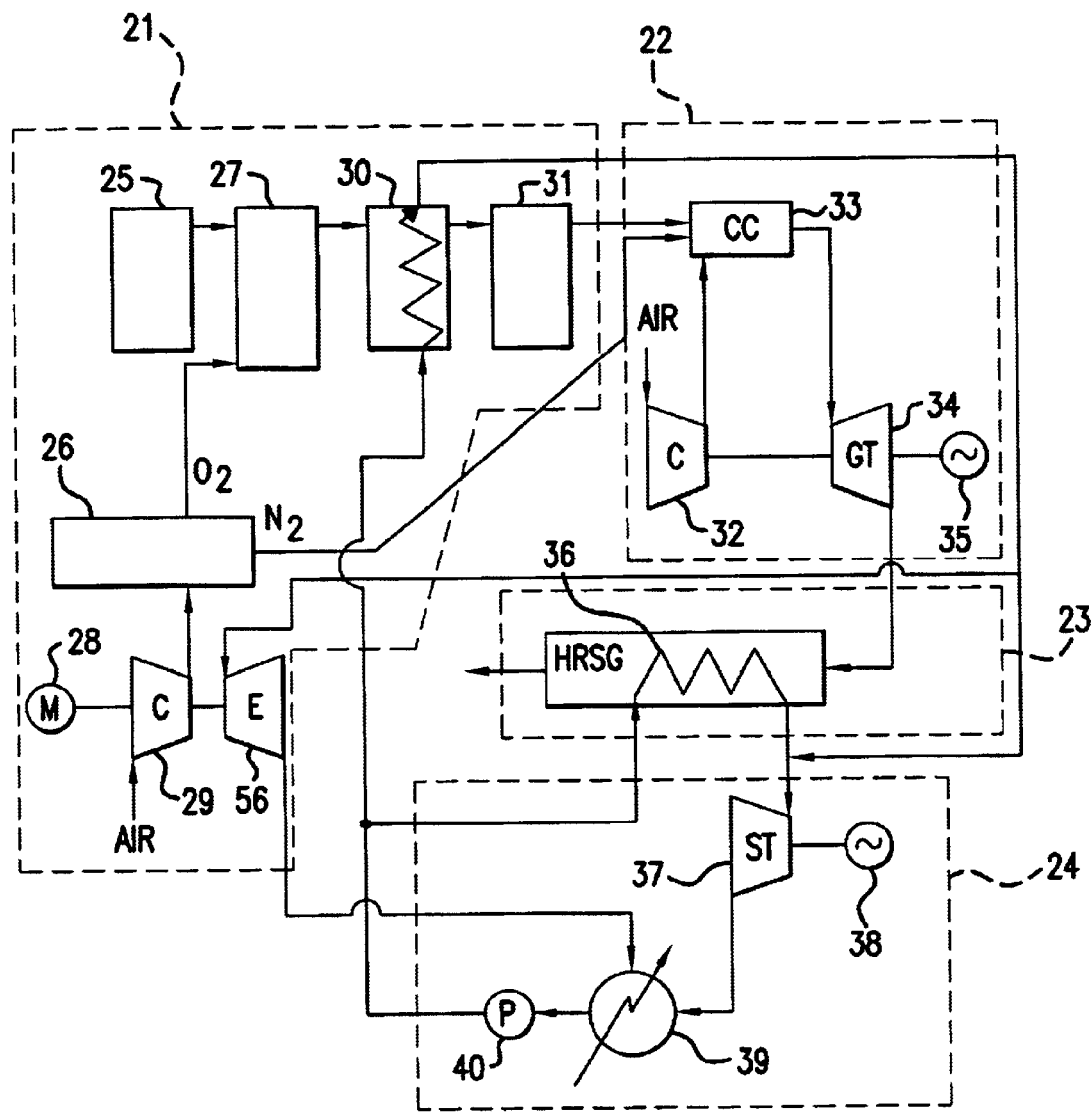
FIG. 10 is a system diagram schematically showing an integrated coal gasification combined cycle power generator according to a tenth embodiment of this invention.

FIG. 10 is a system diagram schematically showing an integrated coal gasification combined cycle power generator according to a tenth embodiment of this invention.

The IGCC of this embodiment includes an expansion turbine 56, which receives air from compressor 29 which also supplies a high-pressure air to an oxygen system 26.

The air-compressor 29 is driven by a motor 28 at start-up operation, and the air-compressor 29 is driven by an expansion turbine 56 during operation.

In addition, the expansion turbine 56 uses a part of a steam supplied from cooler 30 as a working source and supplies steam to condenser 39 of the steam turbine system 24.

As mentioned above, according to this embodiment the motor 28 drives the air compressor 29 at the start-up operation and the expansion turbine 56 drives the air compressor 29 at the loading operation by using a part of the steam generated in the cooler.

Therefore, this embodiment can save a required energy for driving the air compressor 29. As a result, system thermal efficiency can be improved.

It will be readily understood that expansion turbine 56 can be applied to other embodiments.

Figure 11:
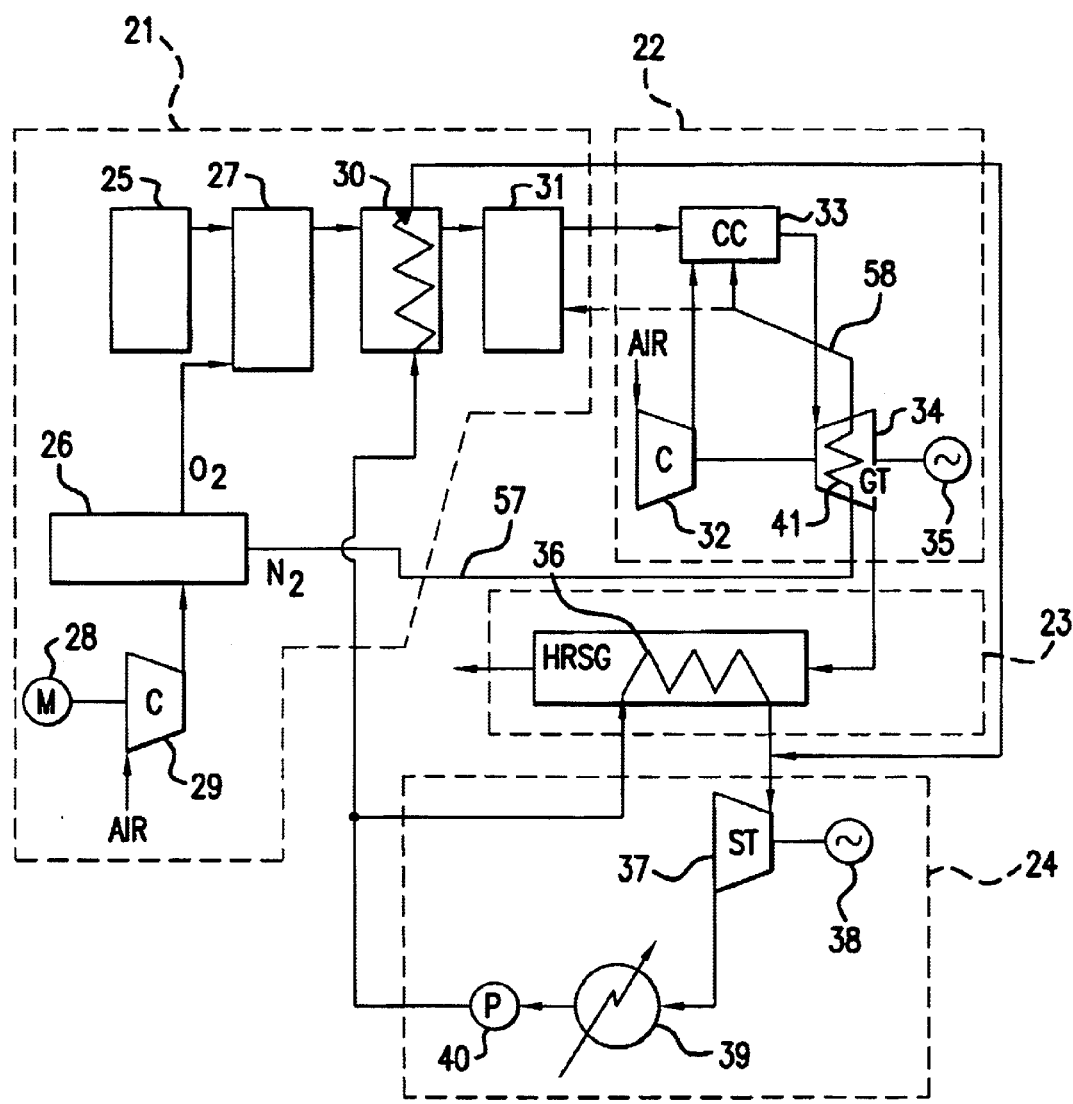
FIG. 11 is a system diagram schematically showing an integrated coal gasification combined cycle power generator according to an eleventh embodiment of this invention.

FIG. 11 is a system diagram schematically showing an integrated coal gasification combined cycle power generator according to an 11th embodiment of this invention.

The IGCC of this embodiment includes a cooling nitrogen gas supply system 57 and a cooling nitrogen gas recovery system 58.

The cooling nitrogen gas supply line 57 comes off an outlet side of an oxygen system 26 in coal-gasification system 21 and is connected to a inlet side of a gas-turbine high-temperature section 41 of a gas turbine 34.

The cooling nitrogen gas recovery 58, from high-temperature section 41 is connected to the inlet side of a gas turbine combustor 33 and also to the gas cleanup unit 31 of the coal gasification system 21.

The high-pressure air supplied to the oxygen system 26 separates into an oxygen gas and a nitrogen gas.

As mentioned above, this embodiment has the cooling nitrogen supply system 57 and the cooling nitrogen recovery system 58. Therefore, this embodiment has some effects described below. First, it maintains a high integrity of the parts by cooling the gas-turbine high-temperature section 41.

Second, a low $No_x$ concentration of the combustible gas, which can be obtained by adding the nitrogen gas into the gasification syngas fuel of the gas-turbine combustor 31, can be reduced.

Third, a back washing of a filter of the gas cleanup unit 31 can be performed by supplying the nitrogen gas.

Therefore, according to this embodiment, the improvement of the system thermal efficiency and the high-temperature of the gas turbine working gas can be obtained by an effective practical use of the nitrogen gas due to the effective cooling of the gas-turbine high-temperature section 41. In addition, the nitrogen gas can be supplied to the high temperature section of the gas-turbine combustor 33.

Figure 12:
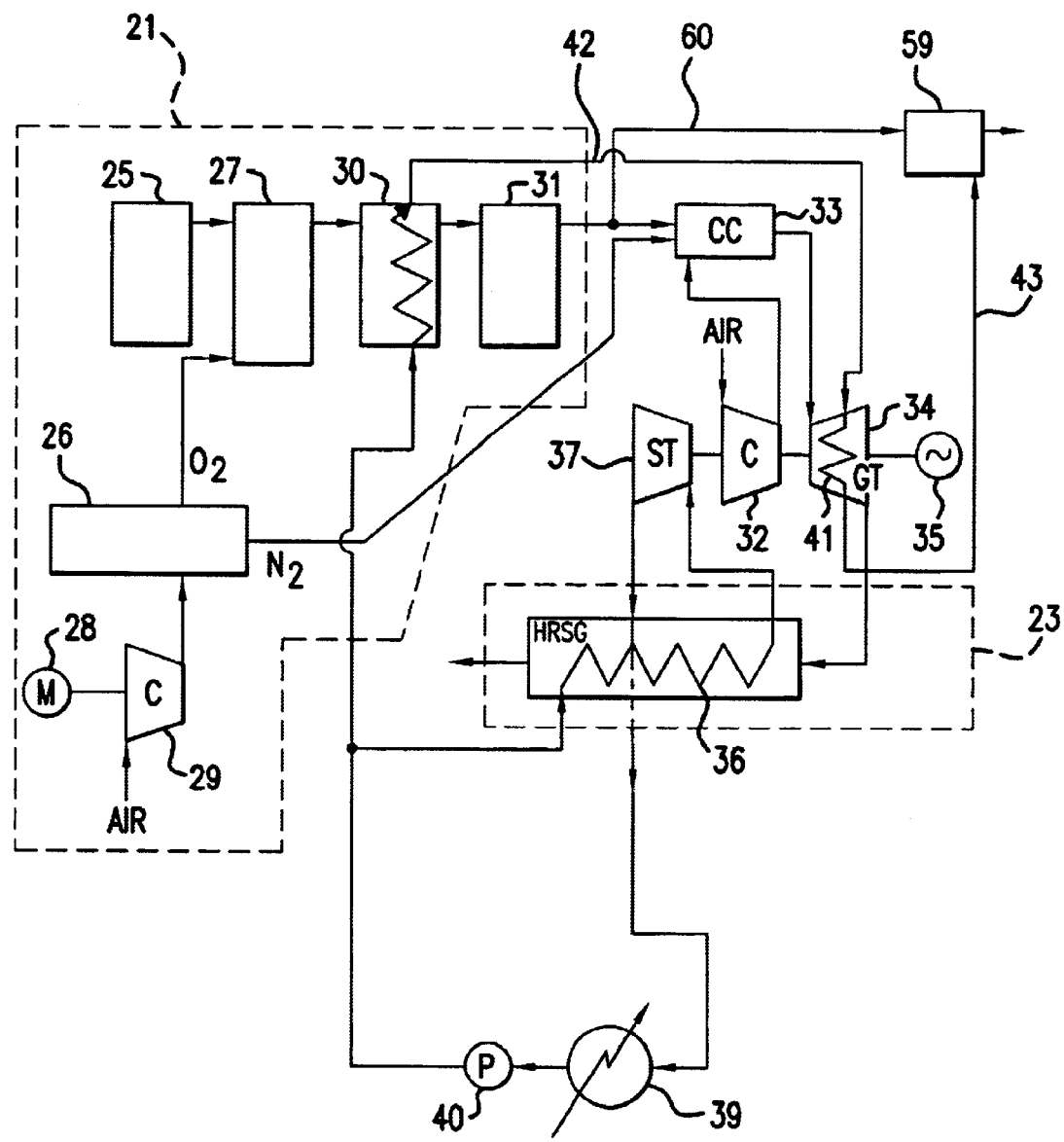
FIG. 12 is a system diagram schematically showing an integrated coal gasification combined cycle power generator according to a twelfth embodiment of this invention.

FIG. 12 is a system diagram schematically showing an integrated coal gasification combined cycle power generator according to a twelfth embodiment of this invention.

The IGCC of this embodiment includes a coal gasification syngas fuel supply line 60, a cooling steam supply system 42 and cooling steam recovery system 43.

The coal gasification syngas fuel supply line 60 supplies syngas to a fuel reformer 59. Line 60 receives a part of the coal gasification syngas fuel from cleanup unit 31, the other part being supplied to a gas turbine combustor 33.

The cooling steam supply system 42 receives steam from cooler 30 and supplies it to a high-temperature section 41 of a gas turbine 34.

The cooling steam recovery system 43 takes steam after it has cooled the gas-turbine high-temperature section 41, and provides it to the fuel reformer 59.

In the fuel reformer 59, the coal gasification syngas fuel from the gas clean-up unit 31 is reformed chemically by the thermal energy in the steam received from cooling the gas-turbine high-temperature section 41.

As mentioned above, this embodiment has the cooling steam supply system 42, the cooling steam recovery system 43 and the coal gasification syngas fuel supply system 60.

Therefore, this embodiment has some effects as described below. First, it maintains the integrity of the parts highly by cooling the gas-turbine high-temperature section 41.

Second, a new fuel, such as methane, can be generated based on the coal gasification syngas fuel and the steam for cooling in the fuel reformer 59, and the new fuel can be utilized effectively widely at other fields. In particular, if the fuel reformer 59 is provided in a fuel-cell power-generator system, for example, an effective practical use of an energy can be made.

In addition, the steam from the cooler 30 can be supplied to the high temperature section of the gas-turbine combustor 33 for cooling.

Further, in this embodiment, although the steam turbine 37 is connected to the air compressor 32 and the gas-turbine 34 in series, this invention is not limited to this structure. That is, a similar effect can be attained where the steam turbine 37 and the air compressor 34 are not connected in series, which is shown in FIG. 1. Furthermore, the use of a fuel reformer 59 can be applied to other embodiments.

Figure 13:
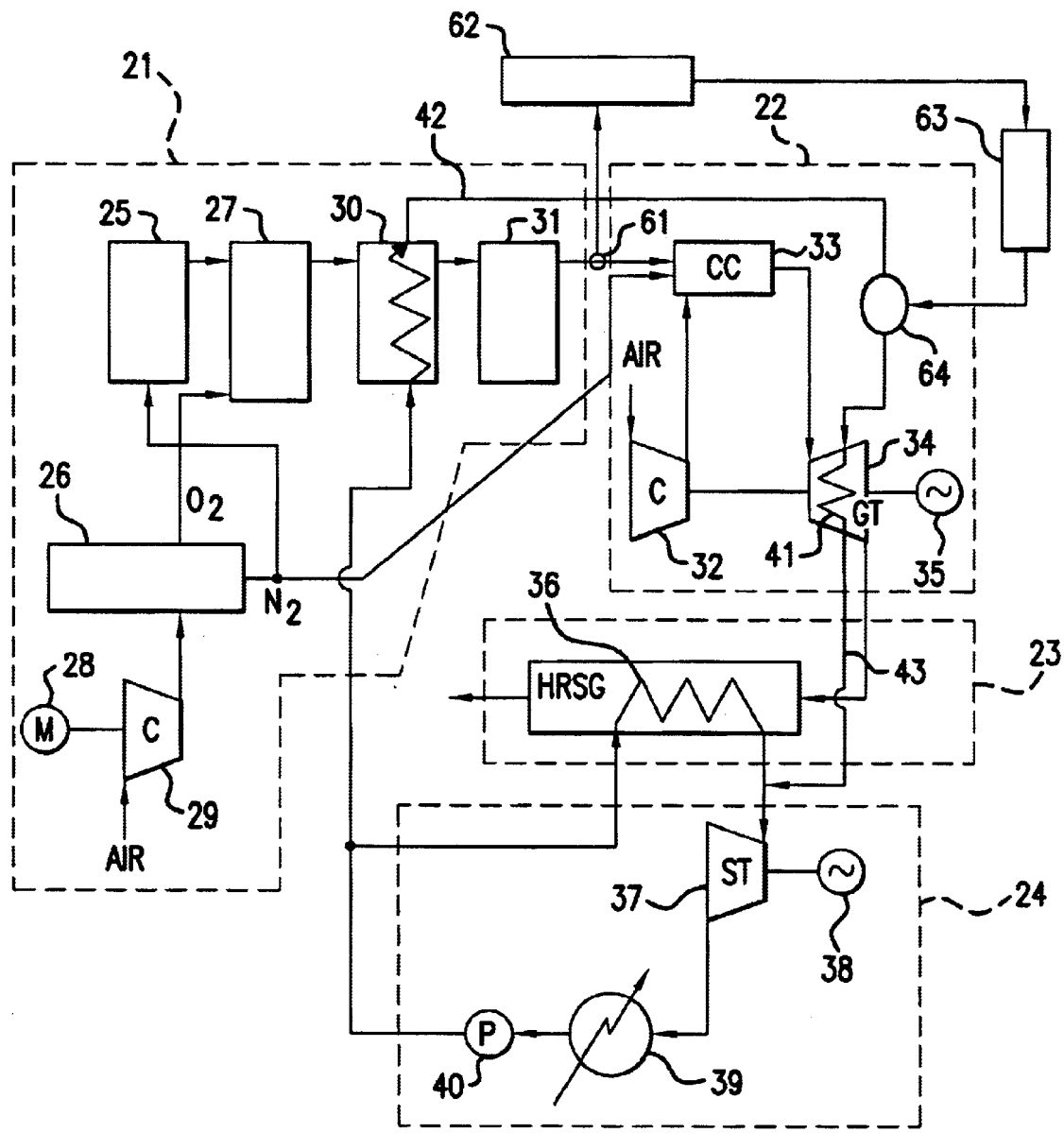
FIG. 13 is a system diagram schematically showing an integrated coal gasification combined cycle power generator according to a thirteenth embodiment of this invention.

FIG. 13 is a system diagram schematically showing an integrated coal gasification combined cycle power generator according to a 13th embodiment of this invention.

The IGCC of this embodiment includes a calorific value detection unit 62, a calculation control unit 63 and a cooling steam mass flow control unit 64.

The calorific value detection unit 62 detects a calorific value of a coal gasification syngas fuel supplied through detection portion 61. The calculation control unit 63 calculates a signal detected in the calorific value detection unit 62.

The cooling steam mass flow control portion 64 adjusts the flux of a cooling steam from the cooler 30 and supplies it to the gas-turbine high-temperature section 41 through a cooling steam supply system 42 in accordance with a signal based on a result of the calorific value detection unit 62.

The oxygen system 26 supply a nitrogen gas to the coal supply portion 25 for pulverized coal feeder.

As mentioned above, this embodiment has the detection portion 61, the calorific value detection unit 62, the calculation control unit 63 and the cooling steam mass flow control unit 64. Therefore, this embodiment has some effects described below. First, this embodiment can supply a stable amount of the steam for cooling to the gas-turbine high-temperature section 41 and hence can perform a stable operation.

Further, this embodiment can reduce or eliminate the need for certain incidental equipment and reduce the power expense required for a pulverized coal feeder.

It will be readily appreciated that the detection portion 61, the calorific value detection unit 62, the calculation control unit 63 and the cooling steam mass flow control unit 64 can be applied to other embodiments.

Figure 14:
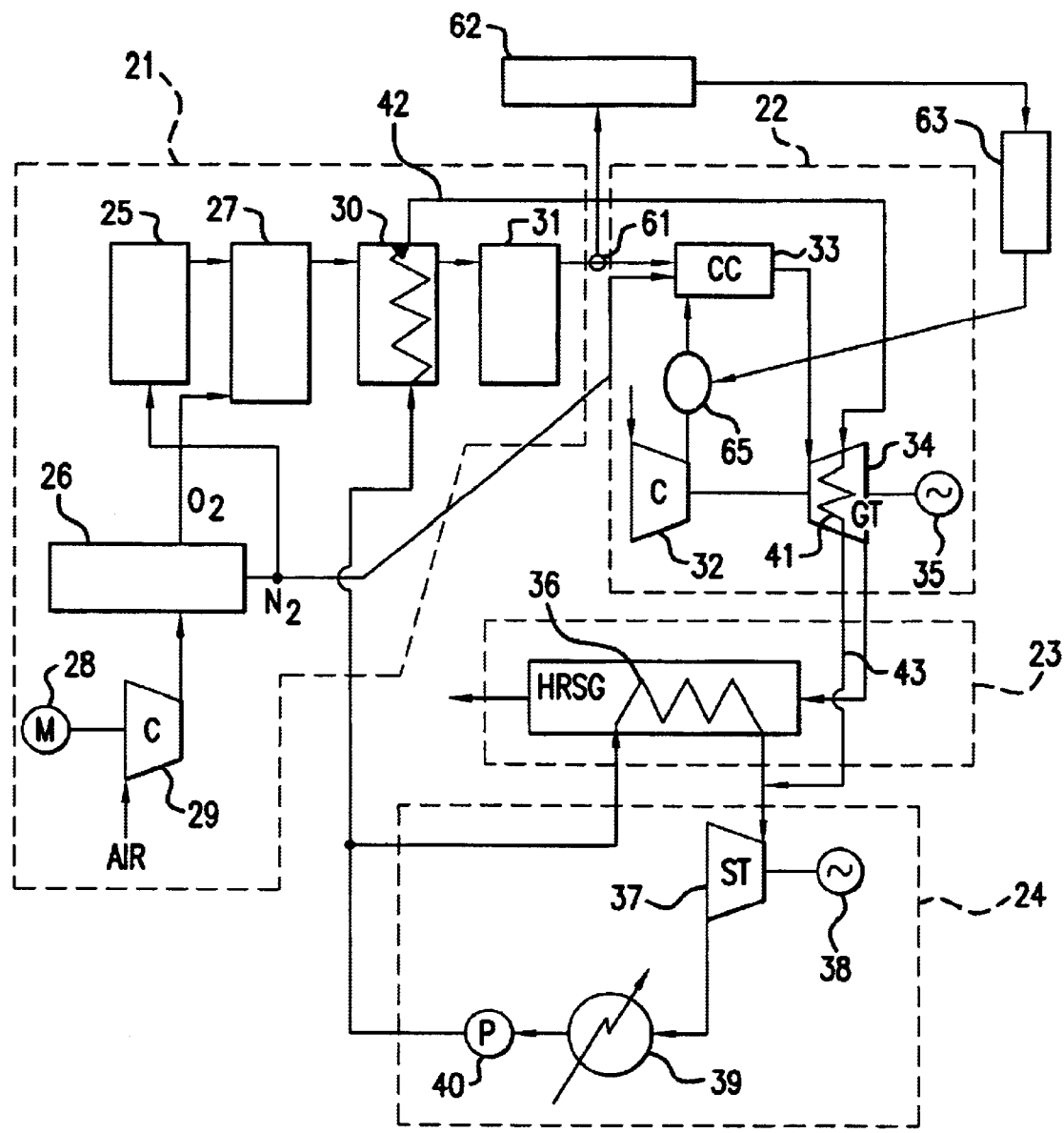
FIG. 14 is a system diagram schematically showing an integrated coal gasification combined cycle power generator according to a fourteenth embodiment of this invention.

FIG. 14 is a system diagram schematically showing an integrated coal gasification combined cycle power generator according to a 14th embodiment of this invention.

The IGCC of this embodiment includes a calorific value detection unit 62, a calculation control unit 63 and an air mass flow control unit 65.

The calorific value detection unit 62 detects a calorific value of a coal gasification syngas fuel supplied through detection portion 61. The calculation control unit 63 calculates a signal detected in the calorific value detection unit 62.

The cooling steam mass flow control portion 65 adjusts a high-pressure air supplied to a gas turbine combustor 33 from air compressor 32 of a gas turbine system 22 in accordance with a signal based on a result of the calorific value detection unit 62.

As mentioned above, this embodiment has the detection portion 61 the calorific value detection unit 62, the calculation control unit 63 and the air mass flow control unit 65.

Therefore, the gas-turbine working gas from the gas turbine combustor 33 is supplied to the gas turbine 34 in accordance with the flux of the steam for cooling from the cooler 30.

In addition, this embodiment adjusts the flux of the high-pressure air supplied to the gas-turbine combustor 33 from the air-compressor 32.

Further, this embodiment can reduce or eliminate the need for incidental equipment and reduce the power expense required for a pulverized coal feeder.

It will be readily appreciated that the detection portion 61, the calorific value detection unit 62, the calculation control unit 63 and the air mass flow control unit 65 can be applied to other embodiments.

Figure 15:
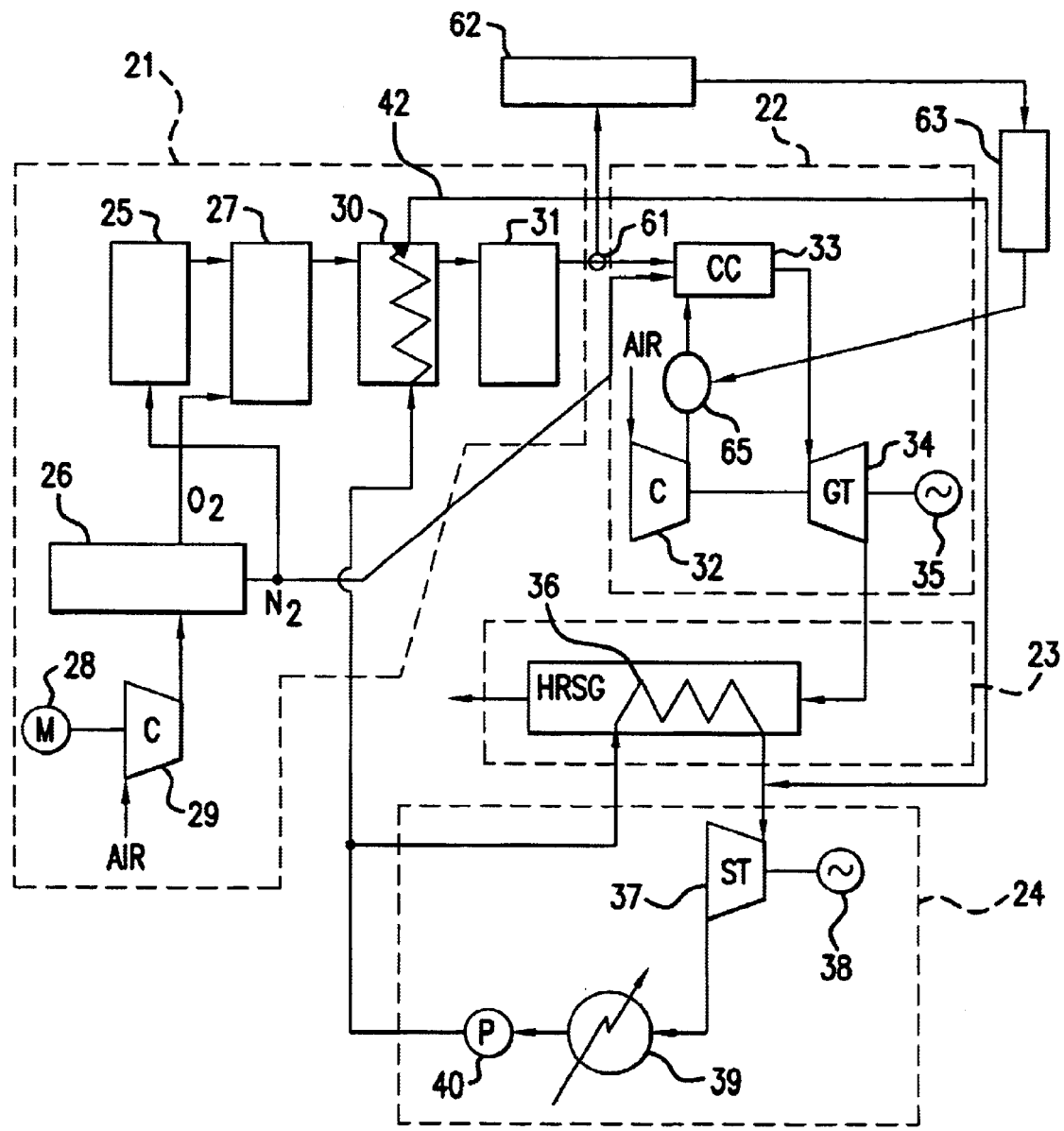
FIG. 15 is a system diagram schematically showing an integrated coal gasification combined cycle power generator according to a fifteenth embodiment of this invention.
Figure 16:
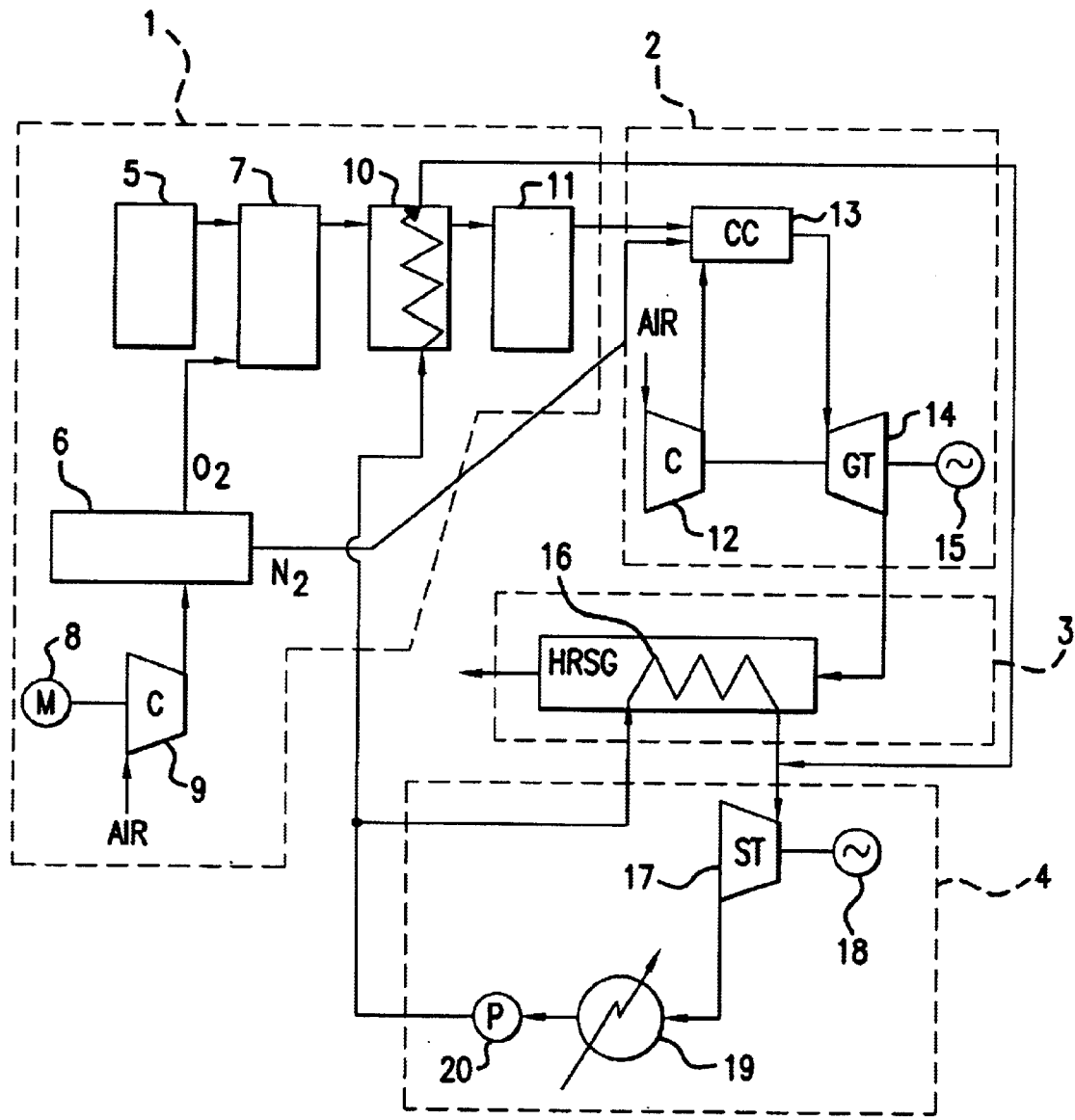
FIG. 16 is system diagram schematically showing a conventional integrated coal gasification combined cycle power generator.

Further, in addition to this embodiment, for example, as shown in FIG. 15, when not cooling the gas turbine 34, the high-pressure air from the air compressor 32 supplied to the gas-turbine combustor 33 can be adjusted by the air mass flow control unit 65.

In particular, the amount of the high-pressure air supplied to the gas-turbine combustor 33 can be measured against the flow quantity of the coal gasification syngas fuel supplied to the gas-turbine combustor 33. In this way, the chance for an accident fire can be reduced, since the gas-turbine working gas is a combustible gas.

As mentioned above, embodiments of the IGCC related to this invention can improve the system thermal efficiency by the effective practical use of the thermal energy. The gas-turbine working gas can be maintained at a high temperature, and the physical integrity and strength of parts of the high-temperature section in the gas turbine system can be kept strong by cooling them.

Further, this embodiment can reduce or eliminate the need for incidental equipment and reduce the power expense required for a pulverized coal feeder.

It will be readily appreciated that the detection portion 61, the calorific value detection unit 62, the calculation control unit 63 and the air mass flow control unit 65 can be applied to other embodiments.

Further, embodiments of the IGCC related to this invention can enable the gas-turbine system to perform the stable operation by adjusting at least one of the cooling steam lines supplied to the gas turbine high-temperature section and the high-pressure air supplied to the gas-turbine combustor to match the calorific value of the coal gasification syngas fuel detected.

We claim:

1. An integrated coal gasification combined cycle power generator (IGCC) comprising:

a coal gasification system for producing a combustible gas from coal in a coal gasification cycle, wherein said coal gasification system supplies said combustible gas to a gas turbine system;

said gas turbine system comprises a gas turbine for performing expansion work using said combustible gas, wherein said gas turbine supplies exhaust gas to a heat recovery system;

said heat recovery system performs heat exchange, wherein said heat recovery system uses said exhaust gas supplied from said gas turbine as a heat source, and supplies steam generated in the heat exchange to a steam turbine system;

said steam turbine system performs expansion work, said steam turbine system comprising a condenser to condense said steam from said heat recovery system into water, said water being supplied to a heat exchanger in said coal gasification system so that said water is heated to steam, wherein at least a portion of said steam from said heat exchanger is supplied to at least one high-temperature section of said gas turbine which is at a temperature higher than a temperature of said steam from said heat exchanger so as to cool said at least one high-temperature section, and wherein high-pressure from an air compressor in said gas turbine system is supplied to cool said at least one high-temperature section of said gas turbine if steam is not yet generated by said heat exchanger in said coal gasification system, wherein the at least a portion of said steam, after having cooled said at least one high-temperature section of said gas turbine, is collected and provided to a steam turbine of said steam turbine system, to be used, along with said steam output by said heat recovery system, to generate steam in a steam cycle, wherein said at least one high-temperature section of said gas turbine comprises at least one of:

a gas turbine nozzle blade;

a gas turbine rotor blade; and a gas turbine rotor, and wherein said IGCC further comprises:

means for determining when steam is being generated by the heat exchanger; and means for providing the high-pressure air from said air compressor in said gas turbine system to cool said at least one high-temperature section of said gas turbine, wherein said means for providing only provides the high-pressure air to said at least one high-temperature section of said gas turbine when the means for determining determines that no steam is being generated by the heat exchanger.

2. An IGCC according to claim 1, wherein the high-pressure air from said air compressor is output directly to said at least one high-temperature section of said gas turbine, without being provided to any other components in a path from said air compressor to said gas turbine.

* * * * *